(12) United States Patent
Rappaport et al.

(10) Patent No.: US 7,574,323 B2
(45) Date of Patent: Aug. 11, 2009

(54) TEXTUAL AND GRAPHICAL DEMARCATION OF LOCATION, AND INTERPRETATION OF MEASUREMENTS

(75) Inventors: Theodore Rappaport, Salem, VA (US); Roger Skidmore, Blacksburg, VA (US); Benjamin Henty, Washington Crossing, PA (US)

(73) Assignee: Wireless Valley Communications, Inc., Austin, TX (US)

( * ) Notice: Subject to any disclaimer, the term of this patent is extended or adjusted under 35 U.S.C. 154(b) by 564 days.

(21) Appl. No.: 11/329,126

(22) Filed: Jan. 11, 2006

(65) Prior Publication Data

US 2006/0116853 A1    Jun. 1, 2006

Related U.S. Application Data

(62) Division of application No. 10/015,954, filed on Dec. 17, 2001, now Pat. No. 7,019,753.

(51) Int. Cl.
*G21C 17/00* (2006.01)
*G09G 5/00* (2006.01)

(52) U.S. Cl. ............................ 702/182; 705/7; 715/716; 345/582

(58) Field of Classification Search .................. 702/21, 702/182, 184, 188; 345/619, 582; 455/449, 455/562.1; 700/95; 703/20; 705/7, 29; 709/202, 224, 232; 715/16
See application file for complete search history.

(56) References Cited

U.S. PATENT DOCUMENTS

| | | | |
|---|---|---|---|
| 4,675,147 A | 6/1987 | Schaefer et al. | |
| 4,736,453 A | 4/1988 | Schloemer | |
| 4,817,012 A | 3/1989 | Cali' | |
| 4,885,694 A | 12/1989 | Pray et al. | |
| 5,111,392 A | 5/1992 | Malin | |
| 5,119,307 A | 6/1992 | Blaha et al. | |
| 5,239,487 A | 8/1993 | Horejsi et al. | |
| 5,293,640 A | 3/1994 | Gunmar et al. | |
| 5,307,261 A | 4/1994 | Maki et al. | |
| 5,337,149 A | 8/1994 | Kozah et al. | |
| 5,339,184 A | 8/1994 | Tang | |
| 5,375,123 A | 12/1994 | Andersson et al. | |
| 5,394,522 A | 2/1995 | Sanchez-Frank et al. | |
| 5,450,615 A | 9/1995 | Fortune et al. | |
| 5,458,123 A | 10/1995 | Unger | |
| 5,465,390 A | 11/1995 | Cohen | |
| 5,467,441 A | 11/1995 | Stone et al. | |
| 5,482,050 A | 1/1996 | Smokoff et al. | |
| 5,485,568 A | 1/1996 | Venable et al. | |
| 5,491,644 A | 2/1996 | Pickering et al. | |
| 5,491,837 A | 2/1996 | Haartsen | |
| 5,493,679 A | 2/1996 | Virgil et al. | |
| 5,515,269 A | 5/1996 | Willis et al. | |
| 5,528,518 A | 6/1996 | Bradshaw et al. | |

(Continued)

OTHER PUBLICATIONS

From Bird's Eye Real-time Mapping Software dated Jun. 30, 2002.

(Continued)

*Primary Examiner*—John H Le

(57) ABSTRACT

A computerized system allows for collecting data for a spatially distributed group of objects or networks by either skilled or unskilled personnel and for analyzing the collected data in an environmental database.

41 Claims, 11 Drawing Sheets

U.S. PATENT DOCUMENTS

| | | | |
|---|---|---|---|
| 5,539,665 A | 7/1996 | Lamming et al. |
| 5,553,312 A | 9/1996 | Gattey et al. |
| 5,553,620 A | 9/1996 | Snider et al. |
| 5,555,354 A | 9/1996 | Strasnick et al. |
| 5,561,841 A | 10/1996 | Markus |
| 5,564,070 A | 10/1996 | Want et al. |
| 5,586,254 A | 12/1996 | Kondo |
| 5,594,946 A | 1/1997 | Menich et al. |
| 5,598,532 A | 1/1997 | Liron |
| 5,615,356 A | 3/1997 | King et al. |
| 5,625,827 A | 4/1997 | Krause et al. |
| 5,636,344 A | 6/1997 | Lewis |
| 5,689,355 A | 11/1997 | Okubo et al. |
| 5,710,758 A | 1/1998 | Soliman et al. |
| 5,755,072 A | 5/1998 | Lingafelter |
| 5,761,093 A | 6/1998 | Urbish et al. |
| 5,774,669 A | 6/1998 | George et al. |
| 5,794,128 A | 8/1998 | Brockel et al. |
| 5,794,216 A | 8/1998 | Brown |
| 5,799,154 A | 8/1998 | Kuriyan |
| 5,802,146 A | 9/1998 | Dulman |
| 5,809,282 A | 9/1998 | Cooper et al. |
| 5,815,395 A | 9/1998 | Hart et al. |
| 5,821,937 A | 10/1998 | Tonelli et al. |
| 5,825,759 A | 10/1998 | Liu |
| 5,828,960 A | 10/1998 | Tang et al. |
| 5,831,610 A | 11/1998 | Tonelli et al. |
| 5,832,389 A | 11/1998 | Dent |
| 5,845,124 A | 12/1998 | Berman |
| 5,861,887 A | 1/1999 | Butler et al. |
| 5,867,112 A | 2/1999 | Kost |
| 5,877,777 A | 3/1999 | Colwell |
| 5,878,328 A | 3/1999 | Chawla et al. |
| 5,907,850 A | 5/1999 | Krause et al. |
| 5,917,808 A | 6/1999 | Kosbab |
| 5,923,850 A | 7/1999 | Barroux |
| 5,926,762 A | 7/1999 | Arpee et al. |
| 5,940,196 A | 8/1999 | Piehler et al. |
| 5,945,976 A | 8/1999 | Iwamura et al. |
| 5,948,055 A | 9/1999 | Pulsipher et al. |
| 5,949,335 A | 9/1999 | Maynard |
| 5,949,988 A | 9/1999 | Feisullin et al. |
| 5,953,669 A | 9/1999 | Stratis et al. |
| 5,963,867 A | 10/1999 | Reynolds et al. |
| 5,970,406 A | 10/1999 | Komara |
| 5,977,851 A | 11/1999 | Stancil et al. |
| 5,987,328 A | 11/1999 | Ephremides et al. |
| 5,994,984 A | 11/1999 | Stancil et al. |
| 6,006,021 A | 12/1999 | Tognazzini |
| 6,018,625 A | 1/2000 | Hayball et al. |
| 6,021,316 A | 2/2000 | Heiska et al. |
| 6,032,105 A | 2/2000 | Lee et al. |
| 6,038,547 A | 3/2000 | Casto |
| 6,044,273 A | 3/2000 | Tekinay |
| 6,058,102 A | 5/2000 | Drysdale et al. |
| 6,058,262 A | 5/2000 | Kawas et al. |
| 6,059,842 A | 5/2000 | Dumarot et al. |
| 6,061,722 A | 5/2000 | Lipa et al. |
| 6,075,541 A | 6/2000 | Maclinovsky |
| 6,085,335 A | 7/2000 | Djoko et al. |
| 6,088,522 A | 7/2000 | Lee et al. |
| 6,104,699 A | 8/2000 | Holender et al. |
| 6,108,309 A | 8/2000 | Cohoe et al. |
| 6,111,857 A | 8/2000 | Soliman et al. |
| 6,122,083 A | 9/2000 | Ohta et al. |
| 6,148,010 A | 11/2000 | Sutton et al. |
| 6,199,032 B1 | 3/2001 | Anderson |
| 6,204,813 B1 | 3/2001 | Wadell et al. |
| 6,208,833 B1 | 3/2001 | Preschutti et al. |
| 6,229,540 B1 | 5/2001 | Tonelli et al. |
| 6,243,772 B1 | 6/2001 | Ghori et al. |
| 6,253,086 B1 | 6/2001 | Parantainen et al. |
| 6,285,377 B1 | 9/2001 | Greenbaum et al. |
| 6,289,203 B1 | 9/2001 | Smith et al. |
| 6,306,089 B1 | 10/2001 | Coleman et al. |
| 6,311,144 B1 | 10/2001 | Abu El Ata |
| 6,317,599 B1 | 11/2001 | Rappaport et al. |
| 6,320,577 B1 | 11/2001 | Alexander |
| 6,326,987 B2 | 12/2001 | Alexander |
| 6,330,005 B1 | 12/2001 | Tonelli et al. |
| 6,337,688 B1 | 1/2002 | Berstis |
| 6,338,031 B1 | 1/2002 | Lee et al. |
| 6,356,758 B1 | 3/2002 | Almeida et al. |
| 6,393,432 B1 | 5/2002 | Flansburg et al. |
| 6,408,312 B1 | 6/2002 | Forthman et al. |
| 6,442,507 B1 | 8/2002 | Skidmore et al. |
| 6,463,431 B1 | 10/2002 | Schmitt |
| 6,470,195 B1 | 10/2002 | Meyer |
| 6,487,417 B1 | 11/2002 | Rossoni et al. |
| 6,493,679 B1 | 12/2002 | Rappaport et al. |
| 6,496,290 B1 | 12/2002 | Lee |
| 6,499,006 B1 | 12/2002 | Rappaport et al. |
| 6,505,045 B1 | 1/2003 | Hills et al. |
| 6,618,630 B1 | 9/2003 | Jundt et al. |
| 6,643,614 B2 | 11/2003 | Ding et al. |
| 6,678,591 B2 | 1/2004 | Ohmura et al. |
| 6,681,140 B1 | 1/2004 | Heil |
| 6,791,571 B1 | 9/2004 | Lamb |
| 6,829,584 B2 | 12/2004 | Loveland |
| 2003/0197721 A1 | 10/2003 | Mindrum et al. |

OTHER PUBLICATIONS

IEEE Transactions on Antennas and propagation, vol. 46, No. 8, Aug. 1998. "Effect of Terrrain on Path Loss in Urban Environments for Wireless Applications" Leonard Piazzi and Henry L. Bertoni.

P. Bahl, V. Padmanabhan, and A. Balachandran, "A Software System for Locating Mobile Users: Design, Evaluation, and Lessons," Microsoft Technical Report, Apr. 2000.

G. Durgin, T.S. Rappaport, H. Xu, Measurements and Models for Radio Path Loss and Penetration Loss in and Around Homes and Trees at 5.85 GHz, IEEE Transactions on Communications, vol. 46, No. 11, Nov. 1998.

C.M. Peter Ho et al., "Antenna Effects on Indoor Obstructed Wireless Channels and a Deterministic Image-Based Wide-Band Propagation Model for In-Building Personal Communications Systems," International Journal of Wireless Information Networks, vol. 1, No. 1, 1994.

S. Kim et al., "Radio Propagation Measurements and Predictions Using Three-dimensional Ray Tracing in Urban Environments at 908 MHZ and 1.9 GHz," IEEE Transactions on Vehicular Technology, vol. 48, No. 3, May 1999.

T.S., Rappaport et al., "Use of Topographic Maps with Building Information to Determine Antenna Placements and GPS Satellite Coverage for Radio Detection and Tracking in Urban Environments," MPRG Technical Report MPRG-TR-95-14, Virginia Tech, Sep. 1995.

R. K. Morrow, Jr. and T.S. Rappaport, "Getting In," Wireless Review Magazine, Mar. 2000.

Wireless Valley Communications, Inc., "SitePlanner 3.16 for Windows 95/98/NT User's Manual," Software User's Manual, pp. 5-148 to 5-156, 1999.

M. Panjwani et al., "Interactive Computation of Coverage Regions for Wireless Communication in Multifloored Indoor Environments," IEEE Journal on Selected Areas in Communications, vol. 14, No. 3, Apr. 1996.

L Piazzi and H.L. Bertoni, "Achievable Acurracy of Site-Specific Path-Loss Predictions in Residential Environments" IEEE Transactions on Vehicular Technology, vol. 48, No. 3, May 1999.

T.S. Rappaport et al., "Wireless Communications: Past Events and a Future Perspective", IEEE Communications Magazine, May 2002.

T,S. Rappaport et al., "Radio Propagation Prediction Techniques and Computer-Aided Channeling Modeling for Embedded Wireless Microsystems," ARPA Annual Report, MPRG Technical Report MPRG-TR-94-12, Virginia Tech, Jul. 1994.

T.S., Rappaport et al., "Use of Topographic Maps with Building Information to Determine Antenna Placements for Radio Detection and Tracking in Urban Environments," MPRG Technical Report MPRG-TR-95-14, Virginia Tech, Nov. 1995.

D. Ullmo et al., "Wireless Propagation in Buildings: A Statistical Scattering Approach," IEEE Transactions on Vehicular Technology, vol. 48, No. 3, May 1999.

T.S. Rappaport, "wireless Communications: Principles and Practice" Second Edition, Prentice Hall, 2002.

T.S.. Rappaport et al., "Use of Topographic Maps with Building Information to Determine AntennaPlacements and GPS Satellite Coverage for Radio Detection and Tracking in Urban Environments," MPRG Technical Report MPRG-TR-95-14, Virginia Tech, Sep. 1995.

T. S. Rappaport et al., "Indoor Path Loss Measurement for Homes and Apartments at 2.4 and 5.85 GHz," private report produced for Motorola, Dec. 16, 1997.

T.S. Rappaport, "Isolating Interference," Wireless Review Magazine, May 2000.

Slides from T.S. Rappaport and R. Skidmore, "Introduction to In-Building Wireless Systems," Infocast In-Building Wireless Solutions Conference and Exposition, Feb. 4, 2003.

S. Sandhu, M.P. Koushik, and T.S. Rappaport "Predicted Path Loss for Roslyn VA, First set of predictions for ORD Project on Site Specific Propagation Prediction," MPRG Technical Report MPRG-TR-94-20, Virginia Tech, Dec. 1994.

S. Sandhu, M.P. Koushik, and T.S. Rappaport, "Predicted Path Loss for Roslyn VA, First set of predictions for ORD Project on Site Specific Propagation Prediction," MPRG Technical Report MPRG-TR-94-20, Virginia Tech, Mar. 1995.

S. Seidel et al., "Site-Specific Propagation Prediction for Wireless In-Building Personal Communication Design," IEEE Transactions on Vehicular Technology, vol. 43, No.4, Nov. 1994.

S. Shakkottai and T.S. Rappaport, "Research Challenges in Wireless Networks: A Technical Overview," Proceeding of the Fifth International Symposium on Wireles Personal Multimedia Communications, Honolulu, HI, Oct. 2002.

H. Sherali et al., "On the Optimal Location of Transmitters for Microcellular Radio Coomunication System Design," IEEE Journal on Selected Areas in Communications, vol. vol. 14, No. 3, pp. 662-673, May 1996.

R, Skidmore et al., "A Comprehensive In-Building and Microcellular Wireless Communication System Design Tool" The Bradley Department of Electrical Engineering, MPRG-TR-97-13, Jun. 1997. Master's Thesis—unpublished by Virginia Tech for 2 years after submission.

Software by Andrew titled "RF Planner" dated Jun. 17, 1997.

A user guide titled: "Andrew Microwave System Planner" dated Jul. 1999.

A user guide titled: "Andrew Antenna System Planner" dated Jun. 1999.

Article "Building Database Manipulator" Copyright, Jan. 1998; MPRG and Virginia Tech.

PCS 97 Track 7; Engineering & Systems Management; T. Rappaport. Propagator; vol. 8, No. 3; Fall 1997.

SMT Plus 1.0 User's Manual; R. Skidmore & T. Rappaport; Copyright, Aug. 1996; Virginia Tech.

R. Skidmore, et al., Russell Senate Office Building Propagation Study, Project Report for Joseph R. Loring & Associates; "Project Update," AoC Contract # Acbr96088, prepared for Office of the Architect of the Capital, Jan. 19, 1997.

R. Skidmore, et al., Russell Senate Office Building Propagation Study, Project Report for Joseph R. Loring & Associates; "Assessment and Study of the Proposed Enhancements of the Wireless Communications Environment of the Russell Senate Office Building (RSOB) and Associated Utility Tunnels," AoC Contract # Acbr96088, prepared for Office of the Architect of the Capitol, Feb. 20, 1997.

R. Torres et al., "CINDOOR: An Engineering Tool for Planning and Design of Wireless Systems in Enclosed Spaces," IEEE Antennas and Propagation Magazine, vol. 41, No. 4 Aug. 1999.

R. Skidmore et al., "Interactive Coverage Region and System Design Simulation for Wireless Communication Systems in Multi-Floored Indoor Environments: SMT Plus *tm*," IEEE ICUPC Proceedings, 1996.

T.S. Rappaport et al., "Radio Propagation Prediction Techniques and Computer-Aided CHannel Modeling for Embedded Wireless Microsystems," MPRG Tech. Report MPRG-TR-95-08, Virginia Tech, Jul. 1995.

Company Web Page "Actix" www.actix.com product name: E-NOS (now E-AMS).

Company Web Page Agilent www.agilent.com product name: OPAS32.

Company Web Page "Agilent" www.agilent.com product name: Wizard.

Company Web Page "Comarco" www.edx.com product name: SignalPro.

Company Web Page "ComOpt" www. comopt.com. product name: CellOpt AFP.

Company Web Page "Lucent" www.bell-labs.com product name: WiSE.

Company Web Page "Ericsson" www.ericsson.com product name: TEMS Lite.

Company Web Page "Ericsson" www.ericsson.com product name: TEMS.

Company Web Page "Marconi" www.marconi.com product name: PlaNET.

Company Web Page "Marconi" www.marconi.com product name: decibelPlanner.

Company Web Page "Schema"www.schema.com product name: Optimizer.

Company Web Page "ScoreBoard" www.scoreboard.com product name: ScoreBoard.

Figure 3

301 — [HEADER]
File Creator: Ben Henty
Company: Wireless Valley Communications, Inc.
Notes: Location file for Blacksburg Office
Date: September 10, 2001
Filename: test2.loc

303 — [FLOOR]

302a
- Basement
- Ground Floor
- Floor 1
- Floor 2
- Floor 3
- Floor 4

303 — [HEIGHT]

302b
- Waist Height
- Eye Level
- Ceiling Height
- 3 ft
- 4 ft
- 5 ft
- 6 ft
- 7 ft
- 8 ft

303 — [ROOM]

302c
- Conference Room A
- Lecture Hall 1
- Room 120
- Room 137
- Room 241
- Room 243

303 — [LOCATION]

302d
- North Wall
- South Wall
- East Wall
- Center of Room
- By windows
- By door
- At desk

[END]

Figure 4a
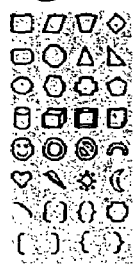
Figure 4b
Figure 4c
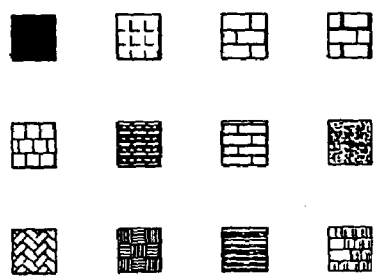
Figure 4d
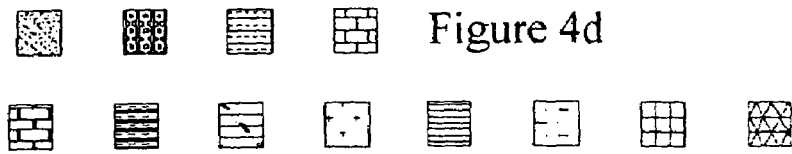
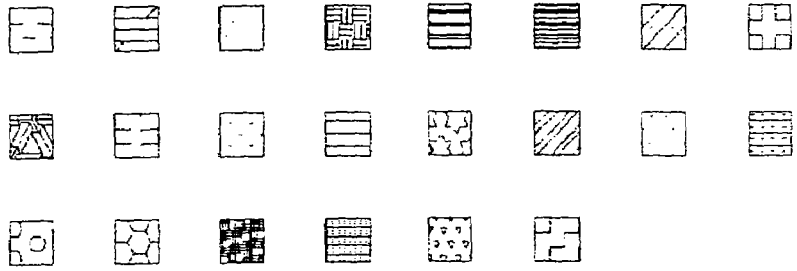

Figure 5

```
Wireless Valley Communications Measurement Logfile,    v2.0      11/30/2001
TYPE:      RSSI_THROUGHPUT
MEASUREMENT RUN:run1
NOTES:
MARKER# FLOOR    ROOM           POS        TIME      THRPUT(KBPS)    RSSI(dBm)
1       FLOOR1   Lecture Hall 1 North Wall 15:08:28  517             -44
2       FLOOR2   Lecture Hall 4 South Wall 15:38:31  317             -65
```

501

502

503

TEXTUAL AND GRAPHICAL DEMARCATION OF LOCATION, AND INTERPRETATION OF MEASUREMENTS

CROSS-REFERENCE TO RELATED APPLICATIONS

This Application is a divisional Application for the application with application Ser. No. 10/015,954filed on Dec. 17, 2001, now U.S. Pat. No. 7,019,753. Further, this application is related to U.S. Pat. No. 6,317,599 entitled "Method and System for Automated Optimization of Antenna Positioning in 3-D," awarded to T. S. Rappaport et al, and pending applications Ser. No. 09/688,145 entitled "System and Method for Design, Tracking, Measurement, Prediction and Optimization of Data Communication Networks," filed by T. S. Rappaport et al, and Ser. No. 09/221,985 entitled "System for Creating a Computer Model and Measurement Database of a Wireless Communication 15 Network," filed by T. S. Rappaport et al, the subject matter of which is incorporated herein by reference.

BACKGROUND OF THE INVENTION

1. Field of the Invention

The invention relates to the field of measurement science and field measurements, and is generally related to the measurement, visualization, and storage of measurable characteristics of any spatially distributed group of objects or networks. Specifically, this invention relates to a method and system used to measure, record, and visualize the quantitative quality or performance metric of measurable parameters as applied to communications networks and the components and infrastructure that comprise such networks. The invention is also applicable, however, to the measurement, interpretation, visualization, and storage of the quality, performance, or observable metrics or features of any group of objects distributed in space, such as a distributed network of power cables, water pipes, heating or air conditioning systems, or groups of buildings, rooms, cars, or other entities that are located in distinct locations and which have properties that may be measured or quantified.

2. Description of the Related Art

Distributed networks of components are used throughout buildings and campuses, and are vital for carrying materials throughout a facility. When buildings are built, wires must be run to connect power outlets to an external power source, and air conditioning or heater ducts must be installed throughout a facility or campus. These distributed networks of components generally distribute air, fluids, or in the case of a communication or power network, electrons, throughout a building or campus. Wireless communication networks distribute radio or optical waves to provide coverage. When distributing a distributed network of components within buildings, or between buildings, or within urban or suburban cores, it is often difficult to locate the physical location and actual installed components that comprise such distributed networks after the building or core is completely built, and field measurements must be conducted to determine suitability, quality, or proper performance of the "hidden" network. Such distributed networks are vital for the operation of any building or campus or urban area, and may include passive or active components that require power or which provide control signals, and which may be in plain sight or may be hidden underground, behind walls, located in raised ceilings, etc.

Alternatively, it is often instructive to quantify the condition, suitability, or to measure or quantify the inventory, of a number of spatially distributed objects that are in plain view. For example, on an army base or in a large apartment complex or shopping mall, there may be many different apartments or rental spaces that need to be checked and validated for suitability for tenants—the chore of ensuring there are sufficient pieces of furniture, appropriate lighting, proper number of rooms, or measuring the cleanliness, condition, or state of each apartment or office is vital to the ongoing inventory management or preparations of a real estate operation, and a computerized method for rapidly inventorying and measuring (e.g. inspecting) the condition or quality or specific counts of particular measurable objects that are spatially distributed and viewable is important.

In the case of distributed communications networks within buildings or campuses, active components, such as base station access points (for wireless local area networks), base stations (for cellular or PCS systems), routers and switches (for wired or wireless networks), cables and conduit that connect such active items, and individual user terminals (such as mainframe or portable computers, handheld devices, Bluetooth devices, or other components (fixed or portable), that may be wired or wirelessly connected to a network) are used to send information from one place to another, and these are often difficult to physically detect. Thus, measurements are often required at various locations, sometimes involving off-the-air monitoring, or monitoring from specific identifiable jacks or outlets, when components of the network are hard to see or hard to reach. Information sent in such communication networks often takes the form of voice, video, or data. To transmit information, a communications network breaks down a message into a series of digital or analog symbols, which are often represented by finite binary numbers in practice. The process of representing information can be analog or digital, as is well understood by artisans in the communications field. Such methods for representing and transmitting messages in an analog or digital communication network are well known in the art, and are described for example in the popular texts "Wireless Communications: Principles and Practice", Prentice Hall, c. 2002, $2^{nd}$ edition, by T. S. Rappaport, or "Digital Communications, Second Edition" by Bernard Sklar, c. 2001. Such transmissions may be carried over wired distributed networks, over the air via wireless RF or optical networks, optical cable networks, or any combination thereof. Similar fundamental knowledge exists for other types of distributed networks, such as cooling or heating distribution networks, plumbing, structured cable or wiring, as known and practiced by skilled artisans in such fields.

For the specific application of a communications network, it is known that data communication networks are a specific type of communication network that transmit digital information, represented as bits or bytes. While conceptually simple, the means of transmitting the data from some point A to some point B can be complicated and may widely vary in implementation. Hundreds of protocols, hardware devices, software techniques, products, and programs exist to handle how data is sent correctly and efficiently. The exact performance of a given data communication network is extremely difficult to predict or even measure because of this complexity. Depending on particular number of users, network delays outside of the campus, or movement or settings of equipment within a facility or a large area network, it is well known that there are a myriad of issues that may impact the performance of a communications network and the channels that carry the information between users of such a network. Such networks require measurements to be performed in-situ so that a technician or service worker can rapidly determine the quality of the network. In the future, however, as wireless and wired digital networks become pervasive, it will be of paramount importance to provide tools and techniques to non-technical personnel so that less-specialized people, or even simple, automated robots, can readily perform installation, test, calibration, troubleshooting, and routine maintenance on distributed networks or spatially distributed objects.

Data communication networks can often be classified as either a circuit switched or a packet switched network, both of which are well known in the art. Both network types use channels to transmit information. A channel is a name give to the communications path (or paths) between users or devices connected in a communications network. A channel may consist of many different individual hardware devices and is a specific route or possible set of routes between a transmitter and a receiver. In a circuit switched network, information is transmitted by way of an exclusively reserved channel. A network channel is reserved temporarily for the sole use of a single transmission and bits are sent all at once for the particular user. An example of this is the use of an AMPS or ETACS voice channel in an analog cellular network or the transmission of a document using a fax machine. After establishing a connection, all data is sent from the first fax machine to the second in a single, long stream of bits. The bits in this case are transmitted as different frequency tones on the telephone line. A high pitched toned may represent a "1" while a low pitched tone may represent a "0." The receiving fax receives the bits of the message by translating the series of high and low pitch tones into data bits and reconstructs the original document.

Packet switched networks are another type of data communication networks in which all data bits are transmitted as many, small chunks of data bits called packets and sent individually from one location to another. A packet is a self-contained portion of a full message that is made up of a header, data bits, and sometimes a footer. The packet contains information in the header and footer that allows the data communications network to properly transmit the packet and to know of which message the data in the packet is a part. Packet switched networks are classified as connection oriented or connectionless depending on how the packets are transferred. In connection-oriented networks, a network channel is used which is predefined for each transmission, whereas, in connectionless networks, packets are sent simultaneously on a shared channel in multiple transmissions. In this case, packets require an identifier that gives the address of the receiver. This address is understood by the communications network to allow the packet to be properly sent to the correct receiver. Since each packet can be transmitted separately and thus interleaved in time with packets from other transmissions, it is generally more efficient to use a connectionless transmission method when using shared network resources.

An example of a connectionless, packet-based transmission is a file transfer between two computers on an internet protocol (IP) based, Ethernet network that both computers are attached to. In this case, the file that is to be transmitted is fragmented at the transmitter into appropriate packets and labeled with the IP address, which is the identifier used by the network to forward the packet to the correct receiver. The packets are then sent from the transmitting computer to the receiving computer. The Ethernet network is capable of supporting multiple file transfers from many different computers all using the same network by controlling the flow of packets from each destination in a shared fashion. The receiver then assembles the packets into an exact copy of the original file, completing the transmission.

All communication networks utilize some form of communication protocol to regulate the transmission and reception of information. A protocol is the set of rules that all hardware and software on a communication network must follow to allow proper communication of data to take place. Many hundreds of protocols are in active use today in the worldwide exchange of information. Some of these protocols, such as the Internet Protocol (IP), Transport Control Protocol (TCP) or the User Datagram Protocol (UDP), define the way in which the network is accessed. Other protocols, such as the Internet Protocol (IP), Hypertext Transfer Protocol (HTTP), or the File Transfer Protocol (FTP), define how messages and packets are formatted, transmitted, and received.

All communication networks may be analyzed and measured in some fashion to evaluate the efficiency and performance of the network as well as to confirm the network is functioning properly. In order to evaluate the functionality of these data networks, certain performance criteria are used. These performance criteria include, but are not limited to: SNR, SIR, RSSI, Ec/Io, number of retries, throughput, bandwidth, quality of service, bit error rate, packet error rate, frame error rate, dropped packet rate, packet latency, round trip time, propagation delay, transmission delay, processing delay, queuing delay, network capacity, packet jitter, bandwidth delay product and handoff delay time. Each performance criterion specifies a different performance parameter of a data communications network, or relates a specific measurement to well known general metrics as taught here. These criteria are further described below, and may be measured to determine, during a field survey or through remote means, the quality of the network under study.

A link is a portion of a path followed by a message between a transmitter and a receiver in a data communications network. Network connections often consist of individual devices relaying network packets from the transmitter to the receiver. This means a network connection can consist of several actual transmissions between the original transmitter and the intended receiver. Each individual relay is called a link. Typically a full network connection consists of several links. Performance criteria can be measured for each individual link. Such concepts and terms are well understood by practitioners.

Received Signal Strength Intensity (RSSI) is a measurement of the strength of the transmitted signal a receiver detects. It is generally measured in watts (W), milliwatts (mW), or decibels relative to milliwatts (dBm), or some other metric that is mathematically related to signal strength (for example, the E-field or open circuit voltage) and reflects the power of the signal being received. In many communication systems, RSSI directly reflects the quality of the connection between the transmitter and receiver. Signal-to-Interference (SIR) and Signal-to-Noise (SNR) are comparisons of the RSSI of the desired signal to the RSSI of other signals (i.e., interferers) or general background, spurious, thermal, or cosmic noise. These comparisons are ratios, generally measured in decibels (dB), and provides a separate perspective on the quality of the communication link between transmitter and receiver. Similarly, Ec/Io is the Energy in a spread spectrum chip, divided by the Interference energy in a detection bandwidth, and this is related to SNR and SIR.

Throughput is a measurement of the amount of data, which can be transmitted between two locations in a data network, not including header, footer or routing information bits. It is generally measured in bits per second (bps) or symbols per second (sps) and can be specified for hardware, software, firmware or any combination thereof that make up a connection between transmitter and receiver in a data communication network. Frame Error Rate (FER) and Bit Error Rate (BER) are statistical measures of the instantaneous or average likelihood of receiving a frame or bit in error through one or more channels or paths in the network, between any two particular network points. Bandwidth is the raw data rate that may be sustained by a given communications network and is generally slightly higher than throughput. For instance, an Ethernet link may be rated for a 10 Mbps bandwidth but a measurement of an actual file transfer may show that the rate at which data can actually be transferred between two computers using that same link is only a throughput of 6.8 Mbps as is taught in Peterson, L. L. and Davie, B. S., *Computer Networks. A Systems Approach*. San Francisco: Morgan Kaufmann Publishers, 2000. Bandwidth may alternatively mean the RF or baseband passband of a filter or channel. Bandwidth is defined in many ways in textbooks such as "Wireless Communications: Principles and Practice," by T. S. Rappaport, c.1996, and the second edition of the same text, c. 2002.

Quality of service (QoS) is a term that is used to describe networks that allocate a certain amount of bandwidth to a particular network transmitter. Such a network will allow a transmission to request a certain bandwidth. The network will then decide if it can guarantee that bandwidth or not. The result is that network programs have a reliable bandwidth that can more easily be adapted to. When the quality of service of a connection is measured, the bandwidth that the network claims to offer should be compared to the actual bandwidth for different requested bandwidths. QoS also relates to packet delay, BER, FER, and the number of retries needed to successfully communicate data packets throughout a network.

FIG. 1 illustrates the difference between bits, packets, and frames. Various error rates are defined for data communication networks for bits, packets and frames. Bits are the core of packets and frames. The bits are the actual message data that is sent on the communications network. Packets include the data bits and the packet header and packet footer. The packet header and packet footer are added by communications network protocols and are used to ensure the data bits are sent to the right location in the communications network and interpreted correctly by the receiver. The packet header and packet footer are also used to ensure that packets are sent correctly and that errors are detected should they occur. Frames are simply series of bits with a certain pattern or format that allows a receiver to know when one frame begins or ends. A bit error rate is the percentage of bits that reach the receiver incorrectly or do not reach the receiver as compared to the number of bits sent. Packet error rate or dropped packet rate is the percentage of packets that reach the receiver incorrectly or do not reach the receiver as compared to the number of packets sent. A frame error rate is the percentage of frames that reach the receiver incorrectly or do not reach the receiver as compared to the number of packets sent.

Several terms are used to quantify the delay times of certain network events and may be expressed in time units of seconds. Packet latency is the time required to send a packet from transmitter to receiver, while Round Trip Time (RTT) is the time required for a packet to be sent from transmitter to receiver and for some sort of acknowledgement to be returned from the receiver to the original transmitter. Propagation delay, transmission delay, processing delay, and queuing delay describe the time required for different portions of a packet transmission to occur. The packet latency and round trip time of a network connection is found by summing the propagation delay, transmission delay, processing delay and queuing delay of either a one way or round trip network connection. Propagation delay is the time required for a packet to traverse a physical distance from the transmitter to the receiver. Transmission delay is the time required from when the first bit of a packet arrives for the last bit of the same packet to arrive. Processing delay refers to the time required to subdivide a data message into the individual packets at the transmitter, and to the time required to recreate the full data message from the data packets at the receiver. Queuing delay refers to the time spent waiting for shared resources to be freed from use by other transmissions. These delay times are all useful for evaluating different aspects of a data communications network performance.

Two other network performance criteria are packet jitter and bandwidth delay product. Packet jitter is the variation in the arrival time of packets that are expected to arrive at a regular rate and is typically measured in time units of seconds. A bandwidth delay product is the number of bits that can be sent from a transmitter before the first bit sent actually reached the receiver. The bandwidth delay product is found by multiplying the packet latency of a certain link by the bandwidth of the same link.

Handoffs occur in wireless data networks when a user moves out of range of one access point and into range of another access point. In this situation, the first access point must pass the responsibility of delivering data to the wireless user to the second access point. The handoff time is the amount of time required by an access point to coordinate with another access point to allow a wireless user to connect from one access point to another access point.

While the above explanation teaches some of the basic parameters that may be measured or which are of interest to current day wireless and wired networks, it should be clear that other important metrics or parameters, which relate to the instantaneous, average, peak, minimum, near-term, or long-term performance of a communications network, are known now or may be known in the future. The above list of parameters are useful to measure and record, so that technicians may understand the functioning of the network, so that troubleshooting, improvements, or evaluation of network quality may be quantitatively obtained through measurement, and displayed, stored, presented, archived, or compared with prior performance levels or metrics that were obtained earlier or by other personnel. Furthermore, it is evident that there are metrics or quantities or values that may be related to the above listing of parameters, which may be known now or in the future, which could be measured to determine or quantify performance levels or quality levels for communications networks, and such metrics may also be measured, monitored, displayed, stored, presented, and compared with prior performance metrics.

While the above description of a communications network has detailed many of the important network parameters that can or should be measured to determine actual performance of a network that is installed in the field, it should be clear to anyone skilled in the art of plumbing, air conditioning, heating, structured cabling, or in other areas that involve the installation, test, troubleshooting, or repair of a distributed network of components within buildings, between buildings, or throughout a group of buildings, that there are other pertinent metrics or quality levels, specific to the particular type of distributed network of components, that can or should be measured to determine the performance of the particular distributed network of interest. For example, to test the performance of an air conditioning system, it is appropriate to measure temperatures in different rooms of a building while the air conditioning system is running, and to record those measured values to determine if the proper distribution of building cooling is occurring. Similarly, water pressure can be measured in a water pipe system at various spatially separated locations in the water piping system; temperatures may be measured to determine if water heaters are functioning and properly distributing heated water throughout a campus; and voltages or currents throughout a distributed cabling system, for example, can be measured to determine if proper power distribution is occurring in a cabling system or structured cable installation. Thus, it is clear that for various distributed networks of components, there are known to skilled artisans various parameters and equipments that are used to properly measure, monitor, display, visualize, store, present, and compare various performance metrics.

Furthermore, it should be clear to one skilled in the art that for purposes of real estate assessment, or for measuring and recording the quality of various objects at different locations in space, it is advantageous to have a means of measuring or quantifying the physical condition, aesthetic quality, suitability for occupancy, condition of the physical conditions, proper amount of furnishings, cost of goods, quantity of particular objects, or other physical or observable attributes involving the suitability or inventory of spatially distributed objects, within a computer device that a relatively unskilled person can carry around for rapid recording of observable results.

The current invention teaches a valuable innovation that allows user-defined, settable or selectable textual strings or graphical icons to be used in conjunction with such field measurements or observations described above, such that the invention provides meaningful contextual displays and recording of information regarding physical location of the measurement or the meaning of the measurement, itself. For example, a facilities manager may wish to evaluate the quality of the paint job or the quality of the paint that has been used at many different buildings throughout a city or a number of cities. By traveling to each city to visit each building, the painter may visually inspect, or use a camera or infrared measuring device or similar measurement tool, to record the particular quality of paint, and such quality of paint job or paint could be measured, displayed, and stored using textual or graphical icons as taught by this invention. For rental property, where various apartments or dormitories are to be rented and each apartment must first be measured or checked for appropriate furnishings, quality, inventory, or suitability, the present invention could be used to rapidly provide a means of displaying, recording and storing the survey results in a manner that conveys significant meaning to the user without requiring the user to understand or know the specifics regarding the measurements or the measurement locations prior to their performance of the field survey. The description below demonstrates that the invention may be applied to a wide range of applications where rapid surveys or measurements or inspections of objects in space are required, often by individuals who lack extensive computer background or training, or who lack specific knowledge of the technical details or rationale for the particular measurements that they are tasked with conducting.

For the specific case of communications networks, software utilities and hardware devices (e.g. measurement tools) have been developed to measure the performance statistics of data communication networks on an on-going basis, instantaneously, or throughout the lifetime of data communication networks. Some of the more common and relevant tools are briefly described here.

A large number of technical, command line tools are available to quickly allow a computer user to measure the approximate network performance of a connection. Many command line programs are widely used on Windows, UNIX, and Macintosh operating systems and are somewhat useful for diagnostic and troubleshooting work on data networks. Examples of these command line programs include ping and traceroute. Using the ping command line program, it is possible to measure approximate data latency between different data network devices and confirm that a network connection is available between the two devices. Network connections often consist of individual devices relaying network packets from the transmitter to the receiver. This means a network connection can consist of several actual transmissions between the original transmitter and the intended receiver. Each individual relay is called a link. Typically a full network connection consists of several links. Thus, using traceroute, a probable path from relaying device to relaying device between the transmitter and the receiver can be determined so that the exact links used by the network transmissions are known. Additionally, using traceroute, the time required to traverse each individual link can be measured, and individual links that may not be functioning properly can be identified.

Various command line tools that are not included with operating systems have also been developed for somewhat more accurate, though still approximate, network measurement tasks. Some examples of these tools include ttcp, and tcpdump. ttcp stands for Test TCP http://www.pcausa.com/Utilities/pcattcp.htm and is a free utility originally written for the BSD Linux operating system, but is now available for other UNIX operating systems as well as Microsoft Windows. ttcp is a basic point-to-point throughput measurement program that allows the user to control buffer sizes, various low level TCP or UDP options and control the exact data that is sent.

tcpdump is a simple utility from the class of tools called packet sniffers. Packet sniffers allow a network administrator to view the content, including header and footer information, of actual packets on a network. tcpdump allows a user to view (or "sniff") packets that are received by a host (though not necessarily intended for that host) and display all headers that match a certain user configurable pattern. tcpdump is a useful tool for troubleshooting network connections because it allows the user a direct view of the exact network traffic.

Pathchar is a UNIX command line utility which is capable of measuring the throughput between each network relay device (e.g. a router, hub or switch) in a data communications network by varying the size of the test packets that it transmits and measuring the latency of that packet transmission to various network points. The tool functions very similarly to traceroute but adds the ability to measure throughput (albeit indirectly), not just latency. Pathchar is only limited by the network hardware in the links it measures. The program needs a hub, switch or computer to transmit an acknowledgement to the test packets. This means that hidden links that do not transmit acknowledgements such as Ethernet bridges cannot be measured individually by pathchar. All of the above listed tools and techniques require some degree of computer capabilities, and often are used by more technical individuals, such as information technology staff members or engineers or technicians skilled in the art of computer communications and networking.

Several companies produce technically sophisticated network measurement, monitoring, tracking and forecasting utilities. Some of the commonly used utilities are discussed below. The tools selected are illustrative of the state of the art of network performance measurement, and illustrate that a high degree of technical knowledge is currently required to properly use such tools.

NetIQ Corporation (formerly Ganymede Software, Inc.) makes a network monitoring and forecasting tool called Chariot. Chariot is able to measure throughput and many other network statistics for all popular network types, operating systems and protocols available today. The program uses a server and several small agent programs to collect data. The server checks each agent, installed on user's computers throughout the network, at regular intervals and uses them to measure network characteristics while storing the results on the server. These agents can measure the network connection to the server or to one another and are capable of simulating the traffic patterns of any network program and any desired usage pattern of one or more hypothetical users. The program is also capable of using the measured data to forecast expected network traffic and conditions.

Visonael Corporation (formerly NetSuite Development Corporation) makes several network tracking and measurement products, including NetSuite Audit, Design and Advisor. These software products are capable of automatically detecting the network equipment in use. This information as well as manually entered information can then be placed in a physical or logical diagram of the network. Visonael also offers a product to verify that networks have been configured properly and can make recommendations for configuration changes and upgrades to your network.

SAFCO Technologies, Inc. (now a part of Agilent Technologies) has created several wireless data measurement and prediction products. SAFCO makes a product called DataPrint, which is used to measure various data performance parameters of mobile telephone data networks.

Berkeley Varitronics has developed hardware products that measure and demodulate various packets in a wireless LAN network. These products include the Cricket, Cicada, Alligator and Grasshopper which measure off-air wireless LAN network signal strengths and data.

Spirent Communications (and its TAS subsidiary) has a number of products for Operations Support Systems (OSS) and network monitoring, including a recent hand-held WLAN measurement system for IEEE 802.11b networks.

Wireless Valley Communications, Inc. has created SitePlanner®, which is capable of predicting, measuring and tracking the site-specific network performance of a data communications network in a three-dimensional computer model of a physical environment. SitePlanner uses a software module called LANFielder™ to measure throughput, packet latency and packet error rates for any wired or wireless network connection in any Internet Protocol (IP) data communications network. LANFielder is detailed in co-pending application Ser. No. 09/688,145. Additionally, SitePlanner allows a full network to be modeled in a physically accurate manner so that precise measurements and performance predictions can be made in a site specific way. The process utilized by SitePlanner to collect and embed measurements into a computer model of a physical environment is detailed more fully in co-pending application Ser. No. 09/221,985.

Several US patents somewhat related to, and which allow, the present disclosed invention are listed below:

U.S. Pat. No. 5,337,149 entitled "Computerized Three Dimensional Data Acquisition Apparatus and Method" filed by Kozah et al;

U.S. Pat. No. 5,458,123 entitled "System for Monitoring Patient Location and Data" filed by Unger;

U.S. Pat. No. 5,491,644 entitled "Cell Engineering Tool and Methods" to Pickering et al;

U.S. Pat. No. 5,528,518 entitled "System and Method for Collecting Data Used to Form a Geographic Information System Database" filed by Bradshaw et al;

U.S. Pat. No. 5,539,665 entitled "Recording and Retrieval of Information Relevant to the Activities of a User" filed by Lamming et al;

U.S. Pat. No. 5,561,841 entitled "Method and Apparatus for Planning a Cellular Radio Network by Creating a Model on a Digital Map Adding Properties and Optimizing Parameters, Based on Statistical Simulation Results" to O. Markus;

U.S. Pat. No. 5,821,937 entitled "Computer Method for Updating a Network Design" filed by Tonelli et al;

U.S. Pat. No. 5,831,610 entitled "Designing Networks" filed by D. L. Tonelli et al.

U.S. Pat. No. 5,878,328 entitled "Method and Apparatus for Wireless Communication System Organization" filed by K. K. Chawla et al;

U.S. Pat. No. 5,598,532 entitled "Method and Apparatus for Optimizing Computer Networks" filed by M. Liron et al;

U.S. Pat. No. 5,794,128 entitled "Apparatus and Processes for Realistic Simulation of Wireless Information Transport Systems" filed by K. H. Brockel et al;

U.S. Pat. No. 5,949,988 entitled "Prediction System for RF Power Distribution" filed by F. Feisullin et al;

U.S. Pat. No. 5,987,328 entitled "Method and Device for Placement of Transmitters in Wireless Networks" filed by A. Ephremides and D. Stamatelos;

U.S. Pat. No. 5,953,669 entitled "Method and Apparatus for Predicting Signal Characteristics in a Wireless Communication System" filed by G. Stratis et al;

U.S. Pat. No. 6,006,021 entitled "Device for Mapping Dwellings and Other Structures in 3D" filed by Tognazzini;

U.S. Pat. No. 6,061,722 entitled "Assessing Network Performance without Interference with Normal Network Operations" filed by W. J. Lipa et al;

U.S. Pat. No. 6,204,813 entitled "Local Area Multiple Object Tracking System" filed by Wadell et al; and U.S. Pat. No. 6,317,599 entitled "Method and System for Automated Optimization of Antenna Positioning in 3-D," filed by T. S. Rappaport et al.

Other US patents that deal with the graphical display of measurement data in a wide range of areas, and which allow the currently disclosed invention, include the following:

U.S. Pat. No. 5,482,050 to Smokoff et al is in the area of medical instrumentation displays. Smokoff et al teach measurement results that map to a settable color table, and further teach that the location of the displayed color pixels may be positioned by the user on a display device. The invention also teaches that a program window may be minimized into an icon when a higher priority window or an alarm is to be displayed. Nowhere does Smokoff et al teach the idea of allowing the user or a programmer to provide a customizable or selectable library of graphical icons or textual strings for the purpose of prompting the user with regard to the type or location of measurement to be performed, nor does Smokoff et al teach the idea of icons or textual strings being used to provide interpretation of measured information by an untrained or unskilled user. Furthermore, Smokoff et al do not provide any spatial information regarding the measurement or the measurement location.

U.S. Pat. No. 5,553,620 to Snider et al is in the area of ultrasound imaging display. Snider et al teach using graphical measurement tools to allow a physician or medical examiner to simplify the ultrasound recording process. Based on the specific diagnosis of the patient, the invention eliminates particular menu or measurement options, and displays a subset of technical menus, for easier use by the physician. Thus, feedback is provided by the apparatus based on observed measurements, where such stimulus may be given by the physician or automatically sensed during use of the invention.

There are clear differences between U.S. Pat. No. 5,553,620 to Snider et al and the presently disclosed invention. Nowhere does Snider et al teach the idea of allowing the user or a programmer to provide a customizable or selectable library of graphical icons or textual strings for the purpose of prompting the user with regard to the type or location of measurement to be performed. Instead, Snider et al provide a specific set of menu text strings that have specific medical meaning, so that the medical professional can select from a subset of potential measurements. Snider et al do not teach the concept of preprogramming, customizing, or recasting the text strings prior, during, or after measurements, nor do they teach the idea of graphical icons or textual strings being used to provide interpretation of measured information by an untrained or unskilled user. In fact, Snider et al do not contemplate the use of graphical icons or text strings for the display or storage of particular measured results. Instead, Snider et al rely on measured results appearing as a scientific, medically pertinent ultrasound recording.

Text strings that are used as cues in Snider et al are clearly intended to have meaning only to trained professional physicians or ultrasound readers. Thus, Snider et al do not contemplate the use of graphical icons or textual strings by those with little technical knowledge, computer knowledge, or analytical ability. Further, Snider does not contemplate spatially distributed measurements, or measurement cues, that allow a user to conduct a rapid survey of a spatially distributed network or group of objects by non-trained individuals. Unlike Snider et al, the currently disclosed invention provides a graphical icon or textual string display for each measurement event or parameter, whereas Snider et al rely on the user being able to select from a specific set of medical menu options to perform measurements of a particular type, as required by the patient's condition. The selection by the user in Snider et al require knowledge of the medical meaning of such menu options, which is very different from the current disclosure. Snider et al do not contemplate the use of any spatial information regarding the measurement itself, nor do they contemplate the icon or text string providing any information to the user with regard to the location of the measurement.

U.S. Pat. No. 6,285,377 to Greenbaum et al pertains to the area of creating a star diagram for use by a physician to analyze disease states. Greenbaum et al teach a method for mapping measured blood sample data with statistical variance into a specific diagram that is based on a mathematical mapping of the values and number of measured parameters. The display is a mathematically constructed star or concentric circle shape, wherein the particular displayed shape is a function of mathematical post-processing that is applied on the measurements using a specific mathematical formulation as described in the body and claims of the patent. Greenbaum et al contemplate the ability to graphically depict a plurality of measurement parameters, wherein each measurement parameter is processed using a collection of individual measurement samples so that the mean and variance for each parameter may be computed. For example, a particular length or width of the star diagram is directly related mathematically to the amount of hemoglobin found in the blood samples.

Nowhere does Greenbaum et al teach the idea of allowing the user or a programmer to provide a customizable or selectable library of graphical icons or textual strings for the purpose of prompting the user with regard to the type or location of measurement to be performed, nor does Greenbaum et al teach the idea of icons or textual strings being used to provide interpretation of measured information by an untrained or unskilled user. Unlike our invention, Greenbaum et al provide a specific mathematical formulation for the creation of a specific display shape to represent a large number of measurement samples and measurement parameters, whereas the current invention teaches a selectable and customizable set of graphical icons or textual strings that may be completely arbitrary and may be completely independent of the particular measurement parameter, defined solely based on a user's personal preference for each measurement. That is, our invention provides a graphical icon or textual string display for each measurement event or parameter, whereas Greenbaum et al require a sampling of numerous measurements and numerous measurement parameters from blood samples before the specific graphical shape can be drawn. Furthermore, Greenbaum et al do not contemplate the use of any spatial information regarding the measurement or the measurement location in their patent, nor do they contemplate the use of the diagram to drive the user to select a particular measurement type or location, or to be used by those with little technical knowledge, computer knowledge, or analytical ability.

U.S. Pat. No. 4,675,147 by Shaefer et al pertains to a graphical display of the safety status within a processing plant. The invention describes a display consisting of a polygon or group of polygons that are scaled and contain rays that map to a mathematical normalization of the particular measured data. Shaefer et al do not teach or contemplate the capabilities or methods of the currently disclosed invention.

U.S. Pat. Nos. 5,953,009 and 6,326,987 to Alexander describe a measurement icon annotation method whereby a user of an oscilloscope is able to annotate waveform measurements and measurement results with graphical icons, so long as the user drags the icons at the appropriate or proximate locations on the display of the oscilloscope. Alexander's invention allows the user to select a particular graphical icon in order to invoke a particular measurement operation on a displayed waveform in the oscilloscope window. The user, who is an engineer or technician, must rely on visual feedback and mental interpretation of the current displayed measurement of the waveform in order to use the invention. That is, Alexander teaches that the user must first view the waveform on the display, and then drag the icon to a particular location on the waveform on the user's display in proximity to the displayed waveform. Thus, the user relies on continuous feedback and technical interpretation of the displayed measurement, and must be able to view and make some interpretation of the displayed measurement (the waveform) in order to make decisions as to how to use the invention (placing the icon). Clearly, Alexander teaches in his invention that an icon must be positioned in a particular location on the display by a user by dragging the icon to a location that is deemed appropriate by the user, through the user's interpretation of the displayed waveform. The particular location on the display at which the user places the icon has a direct determination on the user's obtained measurement result.

The currently disclosed invention is different from Alexander, as the current invention does not require the user to understand or interpret anything about the measurement being carried out, and the user is not required to place or move the graphical icons or textual strings in any fashion on a measurement display—the graphical icons or textual strings in the current invention may be completely arbitrary and completely unrelated to the desired measurement, and do not require positioning on the display by the user. Furthermore, unlike the present invention, Alexander fails to contemplate the idea of the icon or text string having the ability to be activated or to instruct or to provide customizeable cues that may be used to suggest a location or instruction to the user. Alexander does not contemplate an icon or text string having the ability to invoke a measurement by a user without initial knowledge or understanding of the measurement or without interpretation on the measurement display induced by the user. Alexander requires positioning of the icon to a proximate location on the display of the measured waveform, thus requiring the user to first obtain a desired waveform and to then interpret the particular portion of the waveform and the particular measurement that is of technical interest.

Alexander does not teach our concept of the icon providing visual or mental cues that allow the user to invoke a measurement without having to possess any interpretation or knowledge of the measurement being performed. Unlike Alexander, the currently disclosed invention is not sensitive to the positioning of an icon on a screen in order to obtain meaningful measurements. That is to say, the present invention does not relate the graphical icon's position on a display to the accuracy or meaning of the measurement as is required by Alexander. In addition, Alexander does not consider the icon as providing any spatial information to the user as a cue for measurement position or location, nor does Alexander teach that the icon contains spatial information in the display of the measurement results.

Furthermore, Alexander does not teach the idea of allowing the graphical icons or textual strings to be arbitrarily preprogrammed or customized by the user prior to, during, or after measurement use, such that user is able to use icons that have no logical relation to the particular measurement being conducted. Indeed, Alexander assumes a technical user (a technician or engineer) is operating the oscilloscope, and his inventions are geared toward improving efficiencies of technical individuals who must first interpret the displayed measured waveforms before annotating the results with icons.

The inventions, products, and patents cited above are useful for the design or measurement or analysis of the performance of communication networks and for other important measurement functions, such as in the medical field or in plant monitoring, but it is clear to one skilled in the art that it would be difficult for an untrained, unskilled worker to readily use the above listed products, inventions, or patents to rapidly conduct a field survey. That is, while the above-mentioned products or devices may measure one or more of the aforementioned performance metrics and display those in some fashion for analysis, none of the aforementioned inventions, products, or patents provide the means to measure or store measured network performance such that each measurement reading or measurement instruction is associated with some form of textual or graphical identifier that can be used concurrently or at a later time for easy inspection or analysis of the data by a less-technical or untrained individual. None of the prior art contemplates the ability to instruct a user on how or where to collect measurements in an easy fashion, while allowing the measured performance metrics to be stored and displayed (visualized) in a novel way so that an untrained or non-technical or non-specialized worker can rapidly identify with ease the particular meaning or location or position of the measurement.

SUMMARY OF THE INVENTION

The invention provides for a system and method whereby measurement readings may be associated with one or more textual strings or graphical icons that have a specific meaning that allows one to understand or recall with ease the measurement type, measurement location, or measurement meaning by textual or graphical recognition based on one's desired cue or by an agreed-upon or learned symbology that may have nothing to do with the technical details of the measurement, itself. Furthermore, the invention allows, prior to an actual field measurement survey, the loading or preprogramming of textual strings or graphical icons to have particular measurement meanings, measurement instructions, or to denote particular locations or positions, without having to require the user of the invention to understand the technical details or specific attributes of the measurement data, itself. In addition, the invention allows a user to rapidly associate a particular collection of measurements to a particular region on a site-specific environmental model, without the need for the user of the invention to have specific knowledge of the coordinates or exact position location during the measurement survey, itself.

The benefit of the invention is that the user (or someone else) is able to define icons or textual demarcations that allow specific instructions, measurement locations or positions, or measurement meanings to be clear from the user's understood context of the displayed icon, without requiring a site-specific model of the physical environment or requiring technical details or knowledge pertaining to the measurement to be displayed or available during each measurement. Thus, someone with little or no computer background could use the invention to rapidly access, measure, store, and archive field survey results for a myriad of applications, such as conducting field surveys for a communication system whereby the icons or textual strings provide visual cues or prompts that instruct the user to properly locate the equipment for the measurements of interest, and such displayed icons also could indicate to the user whether or not the measurements are acceptable or not, without requiring the user to understand the technical details of the measurement, itself.

Similarly, the invention allows, for example, a property manager to identify the types of data to be recorded through textual context of the icons, prior to the actual survey. As one specific example, a technician could define textual strings that convey the locations and situations that are about to be measured in the field, prior to stepping into the field. Once in the field, the textual strings would prompt the technician or some other user as to what or where or how he was to perform the intended measurement, even though the user may not have an understanding of what she is measuring, where she is measuring, or the significance of the measurement, itself.

Of course, this invention may also be applied to site-specific measurement products that do model the physical environment of interest, such as LANFielder and SitePlanner, which illuminate to the user where the specific measurement is being conducted. Of the aforementioned inventions and products and patents in the prior art, several have the means to store measurement information in real-time for later analysis, and such measurements are generally read into a binary or text file on a computer hard disk. For example, Agilent Technologies' products enable the collection of measured performance metrics relative to a computerized map of the environment. That is, each measurement reading is associated with a physical location in the physical world (e.g., a latitude-longitude coordinate), but such a measurement reading is not displayed with a pre-selectable or field adjustable icon or graphical text string that can be customized to help a non-technical person use the product.

No other aforementioned prior art provides for the display or storage or visualization of a measurement reading that has associated with it a definable and customizable textual string or graphical icon (other than a color variable, marker size, or simple tick mark adjustment) that has been preprogrammed by the user, a priori, to allow the user to instantaneously interpret the measurement value or physical location of the measurement through specific user-assigned contexts of the displayed icon or text message string. That is, in prior art products, a map is a simple bitmap image that does not represent or point out to the user the physical locations of walls, ceilings, or floors that are found on campuses and in buildings, and the measurements from the prior art products and patents do not provide any location-specific text or icon that allows the user to easily determine through context, before, during, or after the field survey, the general location or specific meaning of the measurement.

Furthermore, in the prior art described above, there is not the ability for a user to pre-assign or to assign during or after a measurement survey some specific visual demarcations, such as symbols, shapes, icon graphics, or particular text strings, that may be displayed in real-time to the user of the product during the actual survey or in subsequent surveys. As described in U.S. Pat. No. 6,317,599 by Rappaport and Skidmore, the ability to model and predict performance in a 3-D physical infrastructure model is recent, and the current invention adds to the state-of-the-art with a novel measurement, visualization, and archiving technique that can be used apart from, or in conjunction with, the SitePlanner and LANFielder products.

The present invention extends the prior art in a non-obvious way to provide wireless and wired network performance measurement, in real-time, using a novel display and storage method for the continuous logging, discrete logging, or through manual data collection, for important data communications-specific performance criteria, e.g. performance parameters or metrics, such as RSSI, SIR, SNR, Ec/Io, number of retries, throughput, bandwidth, quality of service, bit error rate, packet error rate, frame error rate, dropped packet rate, packet latency, round trip time, propagation delay, transmission delay, processing delay, queuing delay, network capacity, packet jitter, bandwidth delay product and handoff delay time. The invention contemplated here allows for a technician to walk around a building, or to drive or walk throughout a campus, including in underground tunnels or between floors or in elevators, or to visit a series of buildings, so that a series of field measurements (this process is called a "survey") can be collected, visualized, and stored for any type of distributed network of components or spatially distributed group of objects, based on known measurement techniques used to collect performance parameters such as described above. While the preferred embodiment focuses on a communications network, it is clear that the methods and systems and implementations taught here could be applied to a broad range of in-building and campus wide distributed networks that carry power, heat, air-conditioning, cables, fluids, or other types of distributed infrastructure within a campus, underground, or in-building area, or could be applied for applications such as real estate or assessment of property, where visual inspection of many objects that are spatially distributed is performed during the survey.

A specific embodiment of the present invention is capable of measuring the performance of a communications network in real-time. A person, a fleet of people, or machines (or robots) would typically be equipped with electronic computers that house the current invention, and would walk, ride, drive, or otherwise move throughout a facility, where a facility may be a building, a group of buildings, an army base or other collection of buildings on a campus, a geographic region, or a region in space used to measure any grouping of distributed objects, for example. Using the current invention, the person or machine would collect measured performance readings in different physical locations of the facility, or at different physical locations or positions on a particular object (e.g., at different points on a wall, or at different places on a piece of machinery). At each particular location or position location, the user would record at least one measurement with the current invention. Each measurement reading, or each collection of readings, are associated with one or more textual strings and/or graphical icons that may be preset prior to the survey, or which can be selected, edited, and adjusted during the survey, or after the survey. The measurement readings during the survey are stored in a computer file that may be saved, displayed, printed, copied, or edited. The textual strings and/or graphical icons associated with each measurement reading can be used to provide information to a user of the invention on the approximate location and/or status of the network, receiver, transmitter, machine, or environment at the time the measurement reading was recorded.

Alternately, given a map or 2D or 3D model of the environment in which the measurement readings were collected, the user can use the textual strings and/or graphical icons associated with the intended measurement readings to teach or steer the user to the appropriate locations for measurement, whereby it is understood the user should conduct measurement readings at the general locations suggested by the displayed icon or graphical text.

By assigning or associating one or more textual strings and/or graphical icons to regions or locations within a map or 2D or 3D model of the environment, collected measurement readings can be displayed site-specifically overlaid onto or embedded within the map or 2D or 3D model of the environment by matching the textual strings and/or graphical icons associated with each measurement reading with the same textual strings and/or graphical icons assigned to or associated with particular regions, locations, or objects within the environmental model. Measurement readings may also simply be displayed and logged without site-specific information and without maps, by using the graphical icons or textual string designators that convey meaning.

BRIEF DESCRIPTION OF THE FIGURES

The invention is further described in connection with the following figures:

FIG. 3: Example of a computer file containing specifications for the sets of textual strings and/or graphical icons used by the invention FIGS. 4a-d: Example graphical icons used by the invention FIG. 5: Example of a computer file containing stored measurement readings and their associated textual strings and/or graphical icons

DETAILED DESCRIPTION OF THE PREFERRED EMBODIMENTS OF THE INVENTION

The present invention contemplates a system and method that provides the ability to measure, for example, the performance of communication networks, and the ability to associate each measurement reading with one or more textual strings and/or graphical icons. The present invention uses the textual strings and/or graphical icons to provide a user of the invention additional insight into the general location, network status, object status, or environment status at the instance the measurement reading was recorded. Such information may also be used at a later time, when the user later visualizes or compares the field measurements with past or future measurements.

Given an image (e.g., raster image such as a bitmap, JPEG, TIFF, GIF, TGA, PCX, etc.), map, CAD file, or 2D or 3D model of a physical environment or any other information that constitutes a computer representation of a physical environment (all of which will hereafter be referred to as an "environmental model"), the present invention uses the textual strings and/or graphical icons associated with each measurement reading to provide an indication of the meaning of the measurement, as well as an approximate position or location designation within the computer model at which the measurement reading was recorded. The environmental model may also represent a photo or image of a room or a vehicle, for example.

Figure 1:
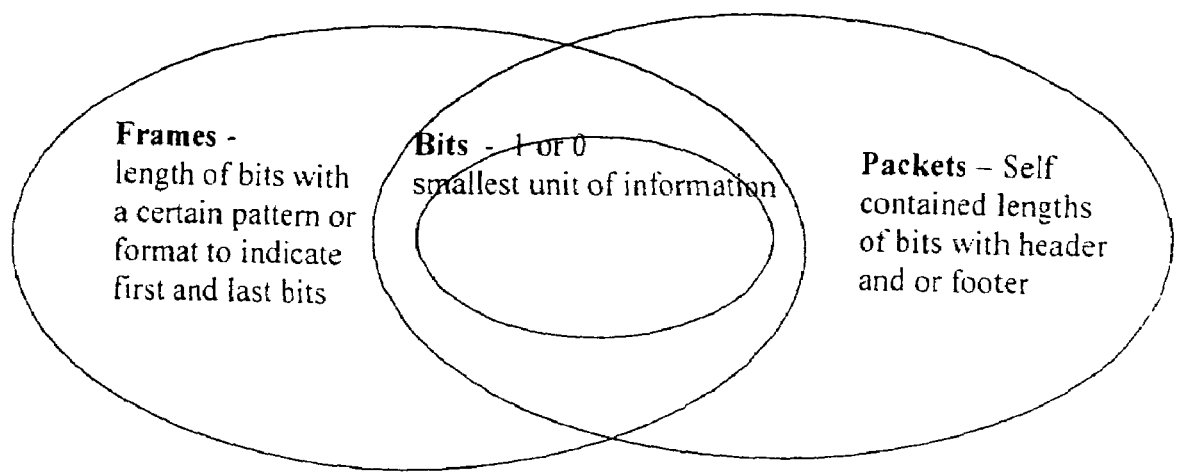
FIG. 1: Illustration of the difference between bits, packets and frames.
Figure 2:
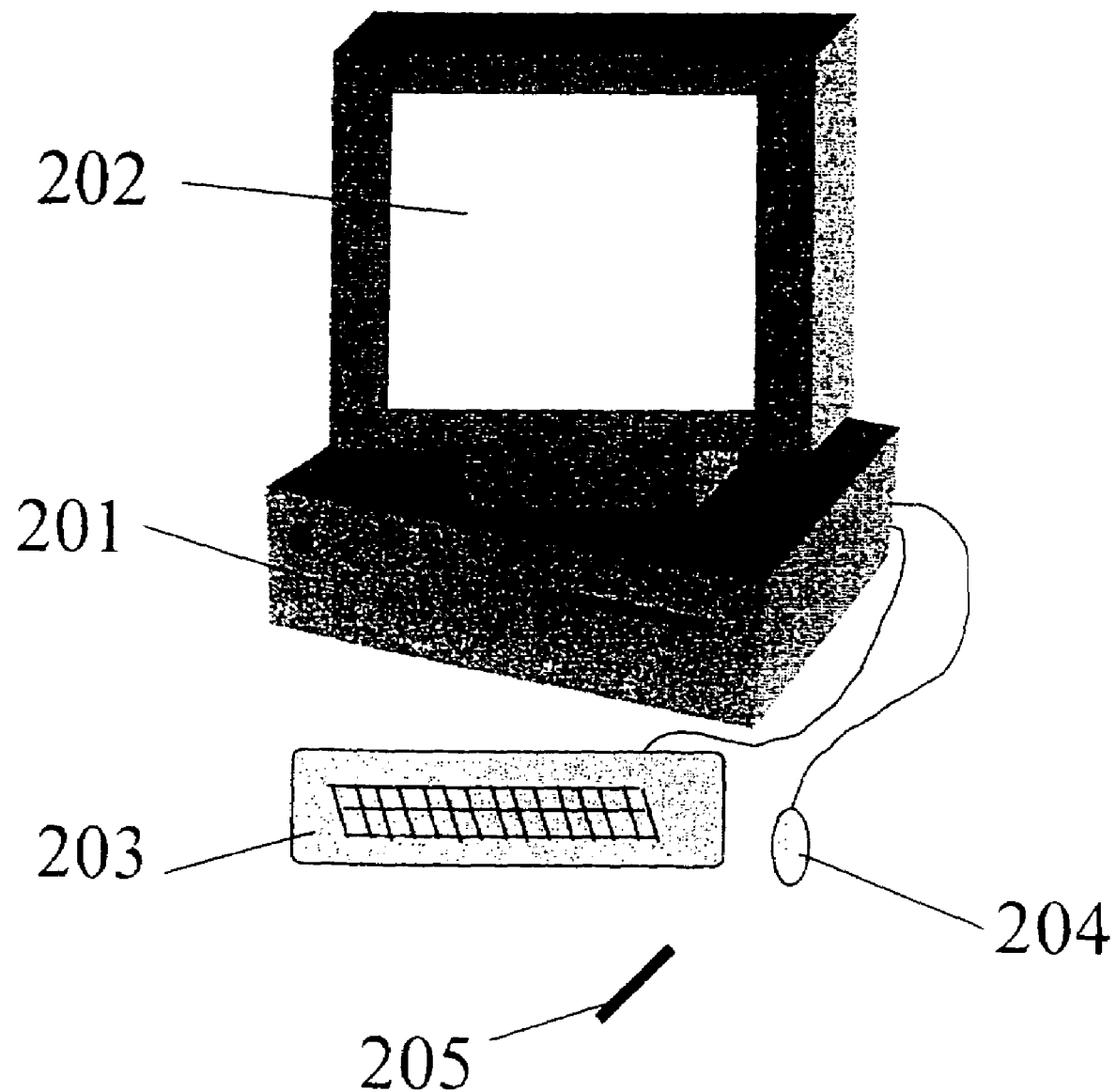
FIG. 2: Example of a personal computer system

The preferred embodiment of the invention is a software program that executes on a personal computer (PC), but which could readily be implemented on a handheld device, a large viewing console, a distributed network of computers, or other computing and display means. As shown in FIG. 2, a personal computer generally consists of a processing unit 201 and a graphical display 202, and optionally a keyboard 203, mouse 204, and/or pen-pointing device 205, or some other input device known now or in the future. Today, personal computing platforms are small and lightweight enough to be carried in one's hand and include such computing devices as Palm Pilots and PocketPCs. While this is a preferred embodiment of the invention, it should be clear to one skilled in the art that any computing platform, including but not limited to personal computers (PCs), Palm Pilots, PocketPCs, mainframe computers, a distributed network of computers, large display consoles, or any other computer or computing device could host the invention.

The present invention utilizes a set of one or more textual strings and/or graphical icons from which one or more entries can be selected to be associated with a measurement reading. The set of textual strings and/or graphical icons that are selectable may be loaded onto the computer platform or stored in the invention by the user or by someone other than the user (who is perhaps more knowledgeable in computer programming and technical details of the invention) prior to, during, or after the field measurement survey. The user is then able to select one or more of the textual strings and/or graphical icons prior to, during, or after the survey and, using commands provided by the invention, associate the selected textual strings and/or graphical icons with each measurement reading. The set of textual strings and/or graphical icons do not need to have any direct relationship with or meaning in the context of the measurement readings. That is, the invention allows for any textual strings and/or graphical icons to be utilized, regardless of relative relationship or meaning when utilized in the context of the measurement readings. However, the originator of the textual strings and/or graphical icons that are to be associated with measurement readings will generally select textual strings and/or graphical icons that provide some form of contextual meaning when associated with the measurement readings that the originator or some other potentially unknowledgeable user may record.

Sets of textual strings and/or graphical icons are stored in computer files that the present invention opens or imports and interprets. Referring to FIG. 3, there is shown an example of a computer file used by the present invention to store textual strings and/or graphical icons that can be associated with measurement data readings. The example file shown in FIG. 3 contains a header section 301 that provides information on the file itself, such as the creator, filename, and the date when the file was created. The example file shown in FIG. 3 contains four sets of textual strings 302a, 302b, 302c, 302d. In the present file format, each set is denoted by a descriptor 303 that is a textual string surrounded by brackets. The textual strings below each descriptor 303 represent a set of textual strings. Any number of textual strings can be used in a given set. In the case of the example file in FIG. 3, there are four separate sets of textual strings. This would enable a user of the present invention who was utilizing the computer file shown in FIG. 3 to assign up to four separate textual strings, one from each of the four sets, to each individual measurement data reading. Although the preferred embodiment of the invention shows the number of textual string sets and/or graphical icon sets as being limited to four, it is clearly the intention of this invention that any number of such sets of icons or graphical text strings could easily be incorporated into the invention and might be desirable, so that there is a library of many different possible displayed icons and/or text strings based on particular field measurement results, or due to the fact that many different locations or positions are to be measured and must be indicated to the user through the icons and/or text strings.

Thus, any reasonable or useful number of such textual string sets and/or graphical icon sets could be represented in the file, enabling a user of the invention to select any practical number of textual strings and/or graphical icons to be associated with each measurement data reading or location in need of measurement. This association between measurement readings and textual strings (or icons) may occur automatically through preprogramming of the invention, where the value of the measurement reading results in one or more textual strings or icons being associated with the reading through a mapping process that may be preprogrammed or specified by a user or programmer, or alternatively through user input, where the user of the invention selects textual strings to be associated with a particular measurement reading. The textual strings themselves can be any combination of letters, numerals, punctuation marks, spaces, or any other characters in any combination and length, although generally a user of the invention will select strings that have some meaning to them, and the creator or programmer of the icons or textual strings will provide contextually-meaningful items that are selectable.

In addition to the textual strings shown in FIG. 3, graphical icons may be used and associated with each measurement reading. A graphical icon is a computerized raster or vector image file of any size, shape, or file format (e.g., Windows Bitmap, JPEG, TIFF, PCX, Windows Metafile, GIF, etc.). The graphical icons that may be used by the invention are not limited in any way, and may include images of geometric figures, symbols, or characters, such as shown in FIG. 4a, colors, such as shown in FIG. 4b, graphical symbols such as smiley faces, light bulbs, check marks, etc., such as shown in FIG. 4c, and/or regions containing a certain pattern, such as shown in FIG. 4d. In addition, digital pictures of a location (e.g., a room, building, ship, or landmark) or object (e.g., engine part, cable, antenna, light post, etc.) may be utilized.

Conceptually, the icons would have a known meaning to the user, so that the user can create a customized library of possible icons so that while in the field, there are certain symbols that alert the user to particular measurement readings, or which the user may select to associate with a specific measurement reading. For example, the invention may be configured so that if a throughput level is above a particular threshold, a smiley face is displayed while the text of the actual measurement is stored in a file. Similarly, if interference is too great or throughput is below the benchmark set by the user, a frown face could be displayed which may have associated with it or displayed beneath or next to it a textual demarcation of the location of the measurement. This association between measurement readings and graphical icons may occur automatically, where the value of the measurement reading results in one or more graphical icons being associated with the reading, or through user input, where the user of the invention selects graphical icons to be associated with a particular measurement reading. It is clear that this approach may also be used by air conditioning, heating and cooling, power distribution technicians, housing personnel that must validate proper furnishings in apartments, and a wide range of other users who need to move throughout a facility to rapidly determine, record, and visualize the performance of a particular network of distributed components or a collection of spatially distributed objects that must be measured or observed.

One advantage of the invention is that it would allow, in some instances, the person conducting the survey in the field to attempt to correct the observed problem before continuing with the survey. For example, adjustments to transmitters, valves, furniture inventory, etc., could be made on the spot, and verified by the non-technical user when a frown-face turned into a smiley-face, for example. The updated survey data would then be stored and the user would have solved a problem in the field on the fly without having to understand all the technical details of the actual measurement system. Another advantage of the invention is that it allows the home office to have up to date information on the site or network or objects being surveyed so that ordering of equipment and repairs or inventory changes can be scheduled more expeditiously.

In one embodiment of the present invention measurement readings and their associated textual strings and/or graphical icons are stored in a shared or separate computer file, although it is clear to one trained in the art that other means could be used to store the same information, including but not limited to multiple computer files, network file servers, shared or flash memory, the executable file(s) of the invention itself, online databases, or any other data storage mechanism that will allow various measurements to be stored in sensible locations for a particular implementation of the invention. In the present invention, this shared or separate computer file will contain all of the measured performance data and the various textual strings and/or graphical icons that are associated with each measurement reading.

Referring to FIG. 5, there is shown the preferred format of this computer file. The computer file contains a header section 501 that provides information on the file itself (e.g., file name, date of creation, file type, etc.). Each measurement data reading is given its own row. In the sample file shown in FIG. 5, there are two measurement readings shown. Each reading has been associated with three textual strings 502. For example, the first measurement reading (identified by Marker 1) has been associated with "FLOOR1", "Lecture Hall 1", and "North Wall" 502. The performance metrics recorded for the first measurement reading were a throughput of 517 kbps and a RSSI of −44 dBm 503. The second measurement reading (appearing as the second row of data and identified by Marker 2) has been associated with "FLOOR2", "Lecture Hall 4", and "South Wall" 502, while its performance metrics were a throughput of 317 kbps and a RSSI of −65 dBm 503.

The association of the measurement data readings with the textual strings as shown in FIG. 5 provides the user of the invention with invaluable information regarding the location at which each of the two measurement data readings were recorded without the need for a site-specific map or model of the facility. Although only textual strings 502 are associated with the measurement data readings 503 shown in FIG. 5, the textual strings 502 could be replaced with graphical icons in the practice of this invention.

Figure 6:
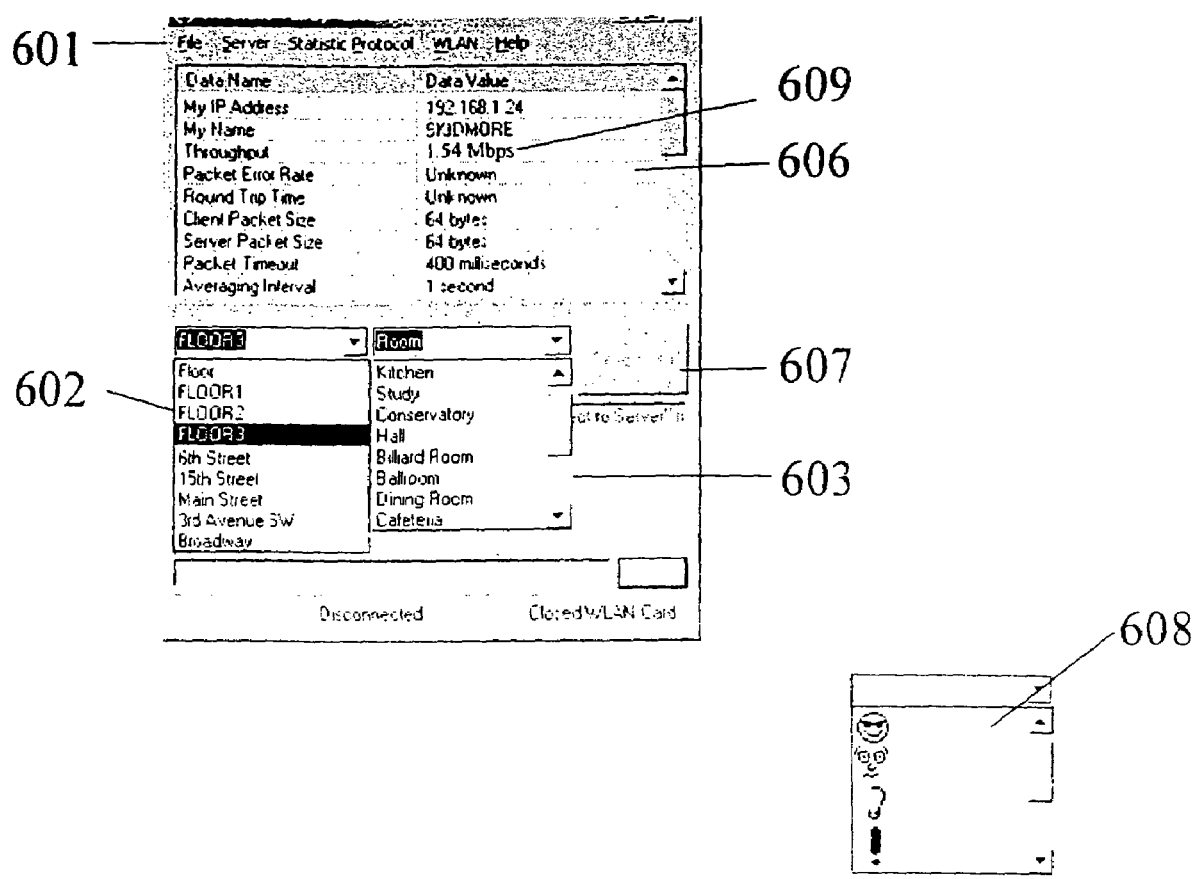
FIG. 6: Example screen capture of the interface of the preferred embodiment of the invention

Referring to FIG. 6, there is shown the primary display of the preferred embodiment of the invention. The main dialog window of the invention 601 provides the user with immediate access to all of the functionality. Measured performance metrics, recorded from the connected measurement device are shown in the upper window 606. This provides the user with immediate information on the status of the communications network being monitored. In this case, the user can immediately see the current throughput reading of 1.54 Mbps 609. The sets of textual strings and/or graphical icons that have been loaded from a computer file, the preferred embodiment of which is given in FIG. 3, are readily accessible in the form of pull-down lists 602, 603. Entries in a pull-down list may be selected using a mouse or other computer pointing device, or may be edited by typing new information using the keyboard or other character input device. In FIG. 6, two such pull-down lists are shown 602, 603. One of the lists 602 contains textual strings denoting building floors (i.e., "FLOOR1", "FLOOR2", etc.) and also street (i.e., "6th Street", "15th Street", etc.). The other list 603 also contains textual strings representing individual rooms (i.e., "Kitchen", "Dining Room", etc.). The textual string entries, which fill the two pull-down lists 602, 603, are read in by the invention from a computer file similar to the one shown in FIG. 4. That is, each pull-down list contains a single set of textual strings and/or graphical icons as defined in a computer file, an example of which is shown in FIG. 4.

The user is able to store a measurement reading by selecting the "Save Data" button 607. When the user selects the "Save Data" button 607, the current measured performance metrics shown in the upper window 606 will be stored into a computer file along with one or more of the textual strings selected from the pull-down lists 602, 603. For example, if the user selects "FLOOR3" from the first pull-down 602 and selects "Kitchen" from the second pull-down 603, and then selects the "Save Data" button 607, the invention places an entry in the measurement file containing all of the measured performance data (e.g., 1.54 MBps) shown in 606 along with the textual strings "FLOOR3" and "Kitchen".

In addition, the user may utilize the computing platform keyboard, mouse, handwriting recognition system, voice activated detector, stylus, knob, touch screen or other textual or graphical input device to enter new textual strings into one or more of the pull-down lists 602, 603. In the preferred embodiment of the invention, this is accomplished by merely selecting one of the pull-down lists 602, 603 with the computer input device, and typing on the keyboard or using some other form of computer input device to specify a new textual string. This new string is then appended automatically onto the set of available textual strings within the selected pull-down list.

Alternately, if graphical icons are available for selection, they may appear in a pull-down list as shown in 608 in place of one or more of the textual strings 602, 603. It should be clear from the above description that, instead of conducting network measurements, it would be possible to record, display, and store measurements for other types of distributed networks, such as the performance of air conditioning, heating, cooling, piping, or other systems. Alternatively, it should be clear that physical observations about the quality or quantity of objects (such as furnishings of a room, quality of paint, or inventory of equipment within a facility) could be similarly stored and represented using the cues and graphical/textual prompting provided by the invention.

Alternately, one or more textual strings and/or graphical icons may be automatically associated with particular measurement readings on the basis of the value of the reading. For example, the invention enables the user to specify that all measurement values which fall within set ranges will automatically be associated with one or more textual strings and/or graphical icons. In a separate configuration, the available textual strings and/or graphical icons available for selection 602,603,608 may change on the basis of the measured reading. If the measured reading falls within a user-defined range of values, different textual strings and/or graphical icons may be available for selection than if the measured reading falls outside of the same range. In addition, the source of the measurement reading and the performance metric it quantifies could also define which textual strings and/or graphical icons are available for selection. For example, if the measurement reading is for temperature, different textual strings and/or graphical icons may be utilized or made available for selection than if the measurement reading is for barometric pressure. Similarly, a user may select different icons or text strings to cause the measurement device (e.g. measurement tool) connected to the invention to perform RSSI, throughput, or Ec/Io measurements, for example. This invention contemplates that several different and customizable icons or text strings could exist on a single measurement platform, thereby allowing a user to perform many different types of measurements using this invention, at one location or in many spatially distributed locations. The user therefore may select more than one text string or icon to select both a particular type of measurement and a location (or position) designator for the desired measurement. The measurement reading or various data contained in the measurement reading may also be displayed using customizable icons or text strings that map to specific results.

Figure 7:
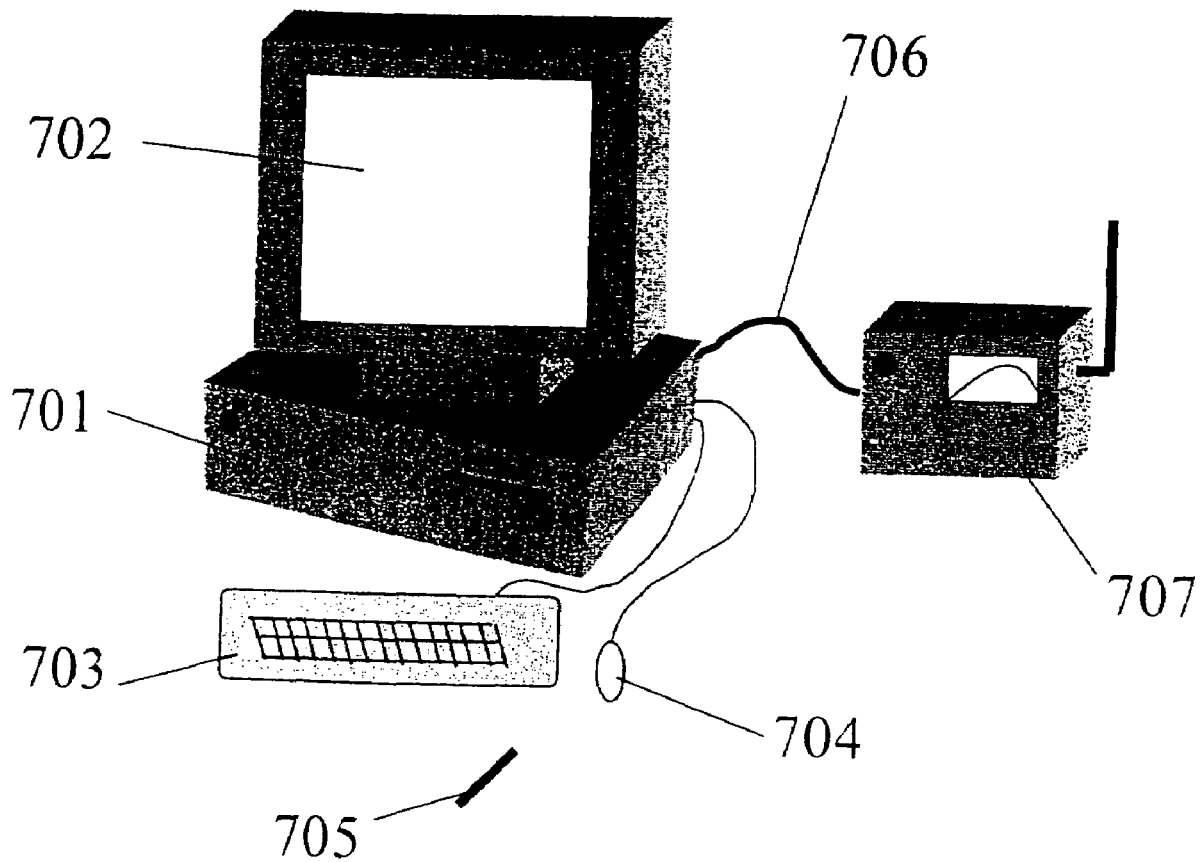
FIG. 7: Example of a personal computer system connected to a measurement device

Referring to FIG. 7, there is shown one possible configuration of the present invention. The invention is a software application that executes on a computer platform 701, and example of such shown in FIG. 2. Typically, the computer platform is small, lightweight, and portable, such as a laptop, pen computer, pocket PC, or Palm Pilot. However, any computing platform such as mainframe computers, a distributed network of computers, large display consoles, or any other computer or computing device could host the invention.

The computer platform 701 is connected to some form of measurement device or measurement tool 707. The measurement tool 707 could be a wireless radio receiver, a transceiver, a spectrum analyzer, a channel sounder, a phone or WLAN, a network logic analyzer, pressure gauge, temperature gauge, flow meter, tachometer, speedometer, digital camera, position location system, direction finder, spectroscopy meter, medical measurement device, chemical analyzer, air quality indicator, toxin detector, range gauge, or any other such electronic, electrochemical, electromechanical, or electro-optical device or other instrument that measures some quantifiable metric and provides the results of the measurement as an electronic signal that can be interpreted by a computing device. The electronic connection 706 between the computing platform and the measurement tool could be a serial cable, Universal Serial Bus (USB) connection, PCMCIA connection, infrared (IR) connection, wireless connection, or any other form of data communication that can be established between two computing platforms. In this configuration of the invention, any measurement readings that the measurement device is capable of recording, including but not limited to RSSI, SNR, SIR, Ec/Io, number of retries, throughput, bandwidth, quality of service, bit error rate, packet error rate, frame error rate, dropped packet rate, packet latency, round trip time, propagation delay, transmission delay, processing delay, queuing delay, network capacity, packet jitter, bandwidth delay product, handoff delay time, temperature, pressure, flow rate, stress, or other measurement parameter known to one skilled in the art, can be measured and associated with one or more textual strings and/or graphical icons, and stored to a computer file as discussed earlier.

Figure 8:
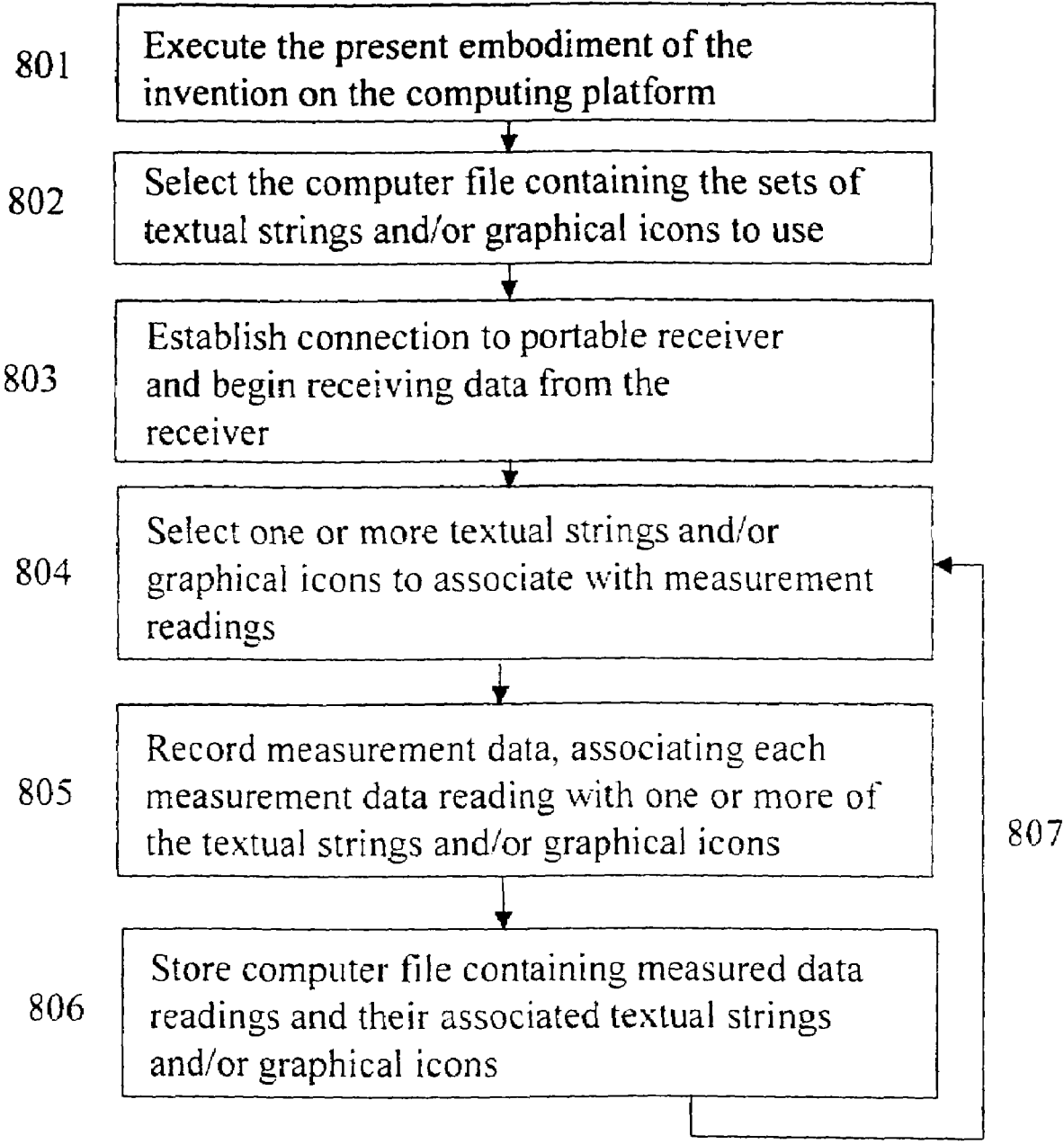
FIG. 8: Method of the preferred embodiment of the invention

Referring to FIG. 8, there is shown an example of the preferred embodiment of the invention when configured as shown in FIG. 7. The user executes the invention on a computer platform 801, which opens the preferred embodiment of the invention and displays a graphical window to the user on the computer platform. One example of the preferred embodiment of the invention displays the dialog window shown in FIG. 8.

Using a computer input device, the user may select commands within the graphical window to open one or more computer files that contain one or more sets of textual strings and/or graphical icons that are to be associated with measured data readings 802. Note that these icons or textual strings may be displayed and stored to offer the user a selectable choice of the type of measurement to be performed, and/or to signify the location or position of the measurement, and/or to represent quality measures or measured performance metrics to associate with the actual measurement reading, and/or a convenient display to signify a particular reading or quality metric. The preferred format of the computer file containing the various icons and text strings available for selection by the user is given in FIG. 3. The invention then establishes a connection with the connected measurement device 803 which may be capable of making many different types of measurements (e.g. RSSI, Ec/Io, Throughput, etc.). Note that in the case where a quality or quantity is to be assessed (e.g., paint appearance or proper furnishings) by the surveying personnel for input by keyboard or graffiti text, then no connection to a measurement device would be required since the quality measure or performance metric data is being measured manually by the user and needs to be inputted by the user. The invention establishes a connection between the computing platform and the connected measurement device 803, and the method and format of establishing such connection (i.e., the communication protocol, physical hardware enabling the connection, etc.) will vary depending on the type of measurement device that is connected. The connecting step can apply to any type of measurement device that is capable of communicating with a computing platform either through a direct or remote data connection of some type. A plurality of measurement devices (tools) may also be connected to the computing platform and used by the invention.

Once a connection is established, the measurement device can report measurement readings to the computing platform in real-time, and those readings can be interpreted by the invention and used to display meaningful information to the user of the invention through the graphical display of the computing platform. In the preferred embodiment of the invention, this display appears as shown in FIG. 6. Alternatively, there may be no need to connect a measurement device, and instead, measured data may be inputted or measured by the user who manually observes the conditions or metrics and makes a judgment or decision about the particular parameter of interest. As a further alternative, the computerized system of this invention may include a master/slave arrangement between a device or plurality of devices used in the facility such that a remote or scheduled measurement survey could be conducted, or so that a known sequence of data could be used or requested by a master controller to provide meaningful measurement results (e.g, the rate of data transfer from the remote device to the master controller may provide a meaningful performance metric).

Using the computing platform input device, the user may select one or more textual strings and/or graphical icons using pull-down lists provided by the invention 804. In the preferred embodiment of the invention, the textual strings and/or graphical icons for selection are displayed as shown in FIG. 6. At any point, the user may elect to store the currently displayed measured performance metrics (or the person's manual measurements or observations (e.g., paint quality)) into a computer file 805. This occurs by using the computing platform input device to select the appropriate command within the application window. In the preferred embodiment of the invention, this occurs by selecting the "Save Data" button as shown in FIG. 6. When this occurs, the currently displayed measured performance metrics along with the currently selected textual strings and/or graphical icons are appended onto a computer file 806. The format of this file as used within the preferred embodiment of the invention is shown in FIG. 5. Other computer file formats could be used within the scope of the same invention. This process then repeats as many times as the user desires 807 during the survey or until the user exits the application. Note that the icons or strings may map to signify interpretations of particular observed measurement readings, and/or to the type of measurement desired, and/or to the location or position of the measurement, as explained above.

Referring again to FIG. 7, it is possible that the measurement device 707 is itself a computing platform that is also executing the invention. In this situation, the measurement device 707 acts as a server that is being connected to by the computer platform 701 that is acting as a client. The form of the connection 706 could be a wired or wireless local area network (LAN), wide area network (WAN), or any other form of connected network. Through this arrangement, the client 701 and server 707 send information to one another in the form of signals, messages or data packets of varying, user-selectable sizes. The total time required for the client and server to exchange these packets is recorded and used to determine various performance metrics of the data network through which the client and server are connected. For example, the client could send 1000 bytes of information to the server and record the time required for the server to acknowledge receipt of the data. Using this information, the client could determine an average throughput for the data network.

The preferred embodiment of the invention can send and receive information using a variety of common computer network protocols, including the Transport Control Protocol (TCP) and the User Datagram Protocol (UDP), and contains various settings for mimicking other protocols such as the Internet Protocol (IP), Hypertext Transfer Protocol (HTTP), and the File Transfer Protocol (FTP). Any computer network protocol could be utilized within the scope of the invention. In this client-server configuration of the invention, performance metrics such as RSSI, SNR, SIR, Ec/Io, number of retries, throughput, bandwidth, quality of service, bit error rate, packet error rate, frame error rate, dropped packet rate, packet latency, round trip time, propagation delay, transmission delay, processing delay, queuing delay, network capacity, packet jitter, bandwidth delay product and handoff delay time can be measured, associated with one or more textual strings and/or graphical icons, and stored to a computer file as discussed earlier. In the preferred embodiment of the invention, both the client and server record the measured performance metrics such that both client and server have all data exchanged between the two platforms.

As referenced above, this process of collecting measured performance data in real-time through the connection to a separate measurement or computing device could also be accomplished through manually entering measured data. That is, instead of acquiring measurement readings in real-time from some measurement device or computing platform that is communicating via some mechanism with the invention, the user may, using the input devices of the computing platform upon which the invention is executing, manually enter data representing performance metrics that are to be recorded. In the preferred embodiment of the invention, this takes the form of the user typing, using the computer keyboard, or writing, using a computer handwriting recognition system, particular measurement data values, notes, or comments that the user wishes to record. Voice recognition, speech initiated control, or voice activation (which we term a voice activated detector) could also be used to translate verbal observations of the user into the invention. The invention associates the manually entered information with the currently selected textual strings and/or graphical icons, displays such information as well as interpreted results shown by the text strings or icons, and stores the information and/or the text strings or icons into the computer file for later visualization, retrieval and analysis.

Once measured performance metrics have been recorded and stored in a computer file, or even prior to this step (that is, prior to the survey), the invention is capable of reading in graphical representations or maps of the physical environment in order to associate the recorded measurement data with the physical locations at which the data was (or is to be) collected by using the textual strings and/or graphical icons associated with each measurement reading. That is, the invention can convert the stored textual strings and/or graphical icons that have been associated with a given measurement reading and convert them into a location within a computer representation of the physical environment, such as provided in the SitePlanner and LANFielder products. This is accomplished by associating one or more textual strings and/or graphical icons with a particular location or region within the computer representation of the environment. Then, for each measurement reading in the stored measurement file, the invention matches the textual strings and/or graphical icons associated with each measurement reading with one or more locations within the computer representation of the environment.

For example, all measurements in the mess hall may have been associated with an icon that represents a dinner plate; all measurements in the gymnasium may have been associated with an icon that looks like a barbell. Then, when the user returns with measured data, the invention can automatically associate and display the measurement results on a facility map, showing site-specific results of measured data.

This provides the ability to make measured performance readings in a site-specific manner even though a site-specific computer representation of the environment was not available to the user at the time the measurement data was collected. This is a powerful new method for providing rapid, easy to perform measurement surveys that can be rapidly imported into site-specific design environments such as SitePlanner, without requiring the user to know specifically what the exact physical layout of the environment is. All the user needs to do is perform a measurement based on the cue given by the particular icon or text string, which instructs the user to the proper location in a facility to perform a measurement. Similarly, the invention may be applied to let users such as real estate assessors or facilities managers to collect field data without the users having to know explicit or exact location information during the survey, yet the graphical icons and/or textual strings have embedded within them or have a correspondence to the specific location information of the particular measurement so that the measured results can be mapped on to site-specific computer databases or onto maps that show city streets, neighborhoods, parts of a campus, or any other physical location details that were not explicitly available to the user of the invention during a survey. This allows a user to make measurements without the need of exact, environmental computer databases or maps, while supporting display of such data on environmental databases or maps after the survey.

Figure 9:
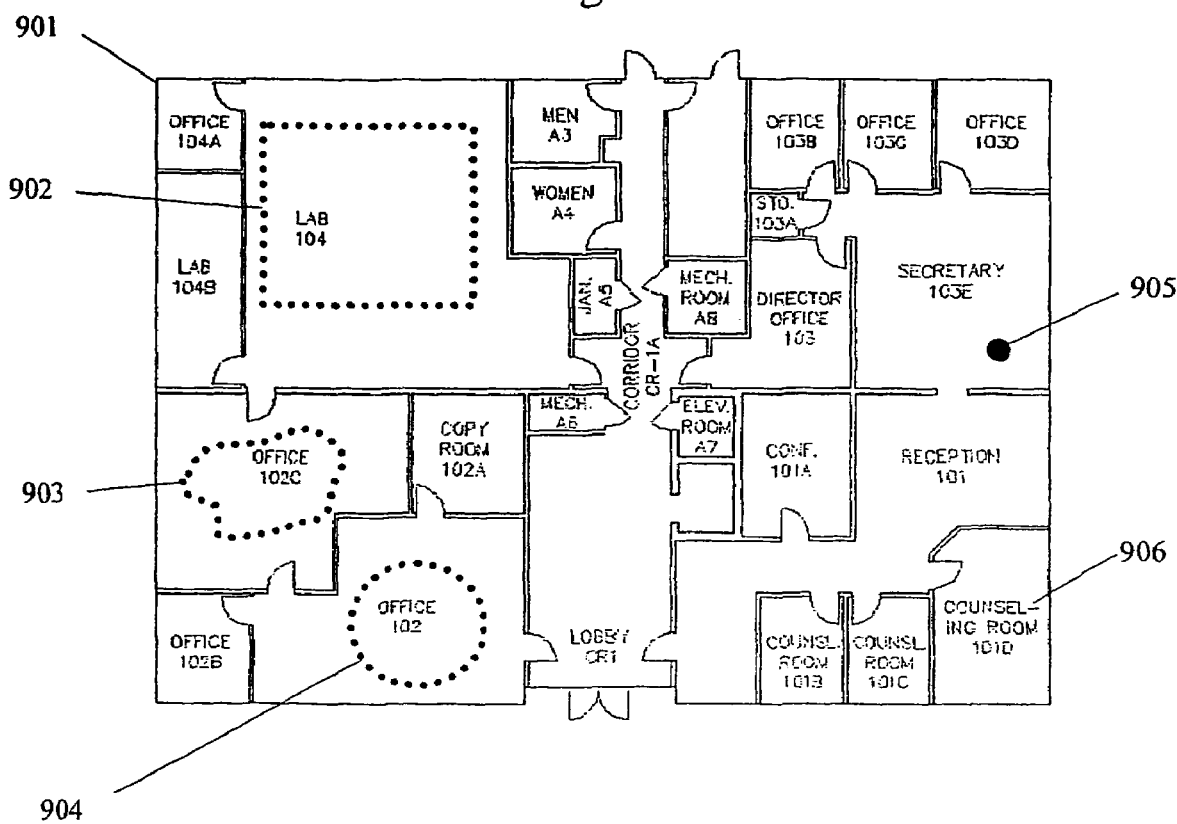
FIG. 9: Associating textual strings and/or graphical icons with locations and/or regions within a 2D computer representation of an environment

Referring to FIG. 9, there is shown a floor plan of a building 901. The preferred embodiment of the invention can open or import any form of raster image (e.g., Windows bitmap, JPEG, TIFF, TGA, GIF, etc.), vector image (e.g., AutoCAD DWG, DXF, DXX, Windows Metafile, etc.), map (e.g., aerial photograph, satellite imagery, etc.), or 2D or 3D computer model of the environment (e.g., Wireless Valley SitePlanner). The invention displays the representation of the environment on the computer display as shown in FIG. 9. Although the image shown in FIG. 9 is two-dimensional, any 2D or 3D model of the environment could be represented. Outdoor environments may also be represented. For example, a street map of a city could be imported and displayed. Once the computer representation of the environment is displayed, the user may associate locations or regions within the computer representation of the environment with one or more textual strings and/or graphical icons within the present invention. Using the present invention, the user may select one or more textual strings and/or graphical icons from pull-down lists as shown in FIG. 6, and then identifies the location or region within the computer representation of the environment where the stored measurement readings that have been associated with those textual strings and/or graphical icons should be displayed.

In the present invention, the selection of the location or region into which measurement readings should be displayed may take several forms. For example, using the mouse or other computing input device, the user may select a polygonal region 902 within the computer representation of the environment, and associate the selected region with one or more textual strings and/or graphical icons using the same techniques discussed above and shown in FIG. 6. Alternately, the present invention allows the selected region to be an elliptical region 904, a non-uniform closed region 903, or a single selected point 905.

In addition, if the computer representation of the environment contains textual labels 907 that denote rooms, streets, or other identifiable locations, the label itself may be used as an identifier of where measurement readings should be displayed. That is, measurement readings with associated textual strings that are equivalent to textual labels contained within the computer representation of the environment may be automatically displayed at the location of the textual label within the computer environment. For example, referring to FIG. 9, if any measurement reading is associated with the textual string "COUNSELING ROOM 101D", it may be automatically displayed at location 907 within the computer representation shown in FIG. 9 because there is an equivalent textual label at that location. Within the present invention, the associations between textual labels and/or graphical icons and various locations and regions within the computer representation of the environment can be edited and changed at any time. This provides tremendous flexibility to the user, who is now able to completely control the site-specific display of collected measurement readings even though the readings themselves do not contain absolute positioning information such as a latitude-longitude coordinate or X,Y,Z coordinates.

Figure 10:
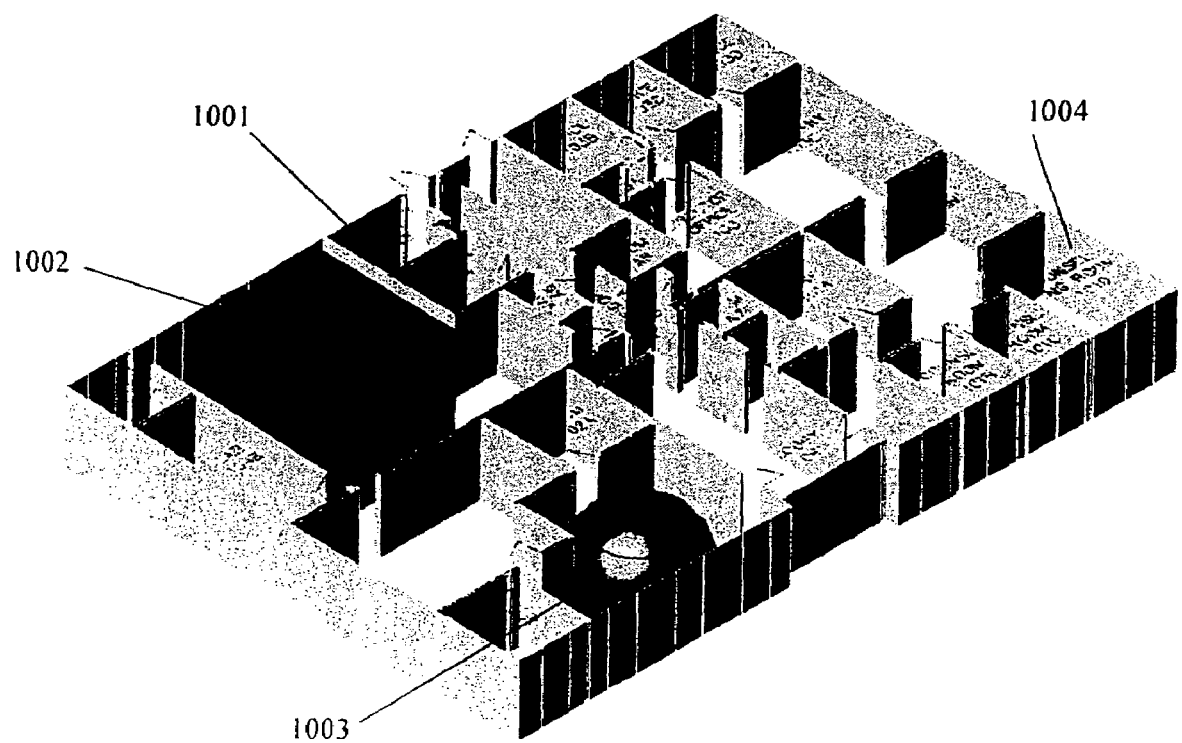
FIG. 10: Associating textual strings and/or graphical icons with locations and/or regions within a 3D computer representation of an environment

A similar process is applied when the computer representation of the environment is three-dimensional, as shown in FIG. 10. The preferred methods of acquiring a three-dimensional representation of an environmental model are provided in co-pending application Ser. No. 09/318,841, entitled "Method And System For a Building Database Manipulator," filed by T. S. Rappaport and R. R. Skidmore and Ser. No. 09/954,273, entitled "Method and System for Modeling Terrain, Buildings, and Infrastructure," filed by T. S. Rappaport et al. Given a 3D computer representation of an environment 1001 and using a computer input device such as a mouse, a user of the invention may select polygonal regions with height 1002, spherical regions 1003, cylindrical regions, individual locations, or identify textual labels 1004 and associate one or more textual strings and/or graphical icons with the selected regions, locations, or labels as described above.

Figure 11:
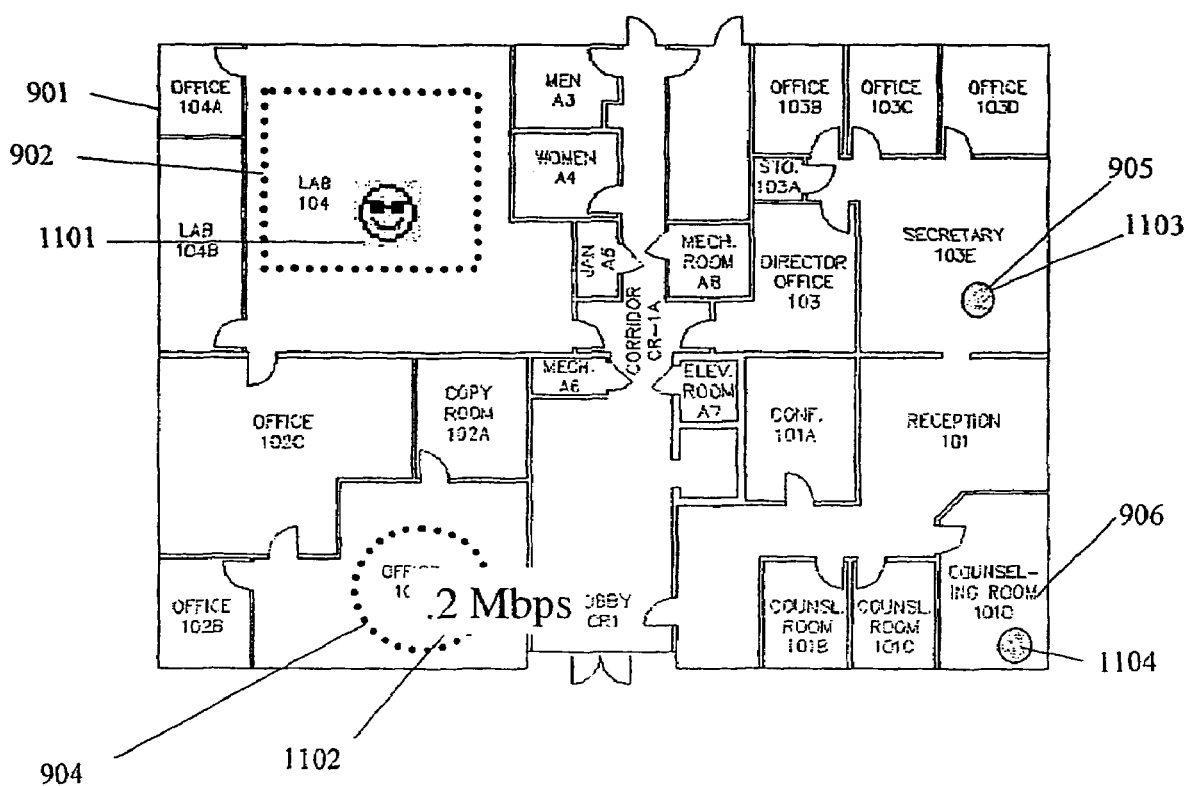
FIG. 11: Displaying measurement readings whose associated textual strings and/or graphical icons have been correlated with specific locations and/or regions within a 2D or 3D computer representation of an environment

Once locations and regions within the computer representation of the environment have been identified, the present invention provides a method and mechanisms to read the stored computer measurement file from step 806 of FIG. 8 and use the associated textual strings and/or graphical icons at each measurement reading to position, embed within, and/or display the measurement readings so they appear as overlaid on the computer representation of the environment. Alternatively, the measurement readings and/or the strings or icons may be kept in separate filed and not embedded in the environmental model. Referring to FIG. 11, there is shown a computer representation of an environment 901 identical to that of FIG. 9. Using the associations identified between the locations and regions marked in FIG. 9 and various textual strings and/or graphical icons, a measurement data file is imported using the invention, and its contents may be displayed. The display of the measurement readings may take many forms. The preferred embodiment of the invention can display numeric measured data readings, such as RSSI, SNR, SIR, Ec/Io, number of retries, throughput, bandwidth, quality of service, bit error rate, packet error rate, frame error rate, dropped packet rate, packet latency, round trip time, propagation delay, transmission delay, processing delay, queuing delay, network capacity, packet jitter, bandwidth delay product and handoff delay time, as textual strings, or circular, spherical, or cylindrical regions of varying color and/or size depending on selected settings. Associated textual strings and/or graphical icons and other assorted measurement information, such as notes, measurement sequence number, and date and time can also be displayed or stored. It should be clear that the invention may also be applied to a myriad of measurement or manual observation applications involving field surveys, such as for real estate applications, heating and air-conditioning, and other areas as described above.

For example, referring to FIG. 11, graphical icons that are smiley faces may have been associated by the user (or some other programmer) with the rectangular region 902. In this case, the present invention determines that both the measurement reading and the rectangular region 902 are associated with the smiley face icon. The invention then displays the measurement data reading within the region identified by the rectangular region 902. In FIG. 11, the selected setting is to display the graphical icon itself 1101. Measurement readings whose associated textual strings and/or graphical icons match those assigned to the circular region 903 have now had a particular measured value displayed as a textual string 1102. In this case, the "2 Mbps" actual measured throughput reading has been displayed 11102. Measurement readings whose associated textual strings and/or graphical icons match those assigned to the selected point 905 have had a particular measured value displayed as a circular area of color 11103, where the radius and color of the circle correspond to some user determined range for the selected value. Measurement readings that are associated with the "COUNSELING ROOM 101D" textual string have had a particular measured value displayed as a circular area of color 1104 at the same position as the "COUNSELING ROOM 101D" textual label 906. As 3-D displays become popular, it is conceivable that varying the 3-D aspect ratio or size could be employed.

While this invention has been described in terms of its preferred embodiments, those skilled in the art will recognize that the invention can be practiced with considerable variation within the scope of the appended claims. In particular, the visual or textual demarcations could be used in conjunction with measurement systems or processes for any type of in-building or campus environment, where spatial position information or contextual measurement information is needed during a site survey, or for any type of measurement survey of distributed objects in space, such as in real estate, law enforcement, military applications, heating and air-conditioning, and any other application where field surveys need to be conducted efficiently and easily.

We claim
1. A computerized system for collecting data for a spatially distributed group of objects or networks, comprising:
  a measurement data input which receives measurement information selected from the group consisting of measured performance metrics and inputted quality measures;
  a descriptive data input which receives descriptive information from a predefined set of selections wherein said selections are selected from the group consisting of text strings and icons;
  means for associating said measurement information with said descriptive information within a region of the environment; and
  a display for displaying the measurement information, descriptive data input and environment, the display displaying the measurement information within the region of the environment in response to a selection from the group of text strings and icons of the descriptive data input.

2. The computerized system of claim 1 further comprising at least one measurement tool linked for data communication to said measurement data input.

3. The computerized system of claim 2 wherein said measurement tool is electrically connected to said measurement data input.

4. The computerized system of claim 2 wherein said measurement data input is located on a host computer and said descriptive data input is located on a slave computer, and wherein measurement information received by said measurement data input is a performance metric based on communications between said host computer and said slave computer.

5. The computerized system of claim 2 further comprising a means for selectively entering said measurement information to said measurement data input.

6. The computerized system of claim 5 wherein said measurement information is a quality criteria that is selected by said means for selectively entering from amongst a plurality of pre-defined selections.

7. The computerized system of claim 5 wherein said means for selectively entering is selected from the group consisting of a keyboard, button, switch, stylus input, mouse, touch screen, knob, and voice activated detector.

8. The computerized system of claim 1 wherein said pre-defined set of selections includes at least a first list and a second list of said selections.

9. The computerized system of claim 8 further comprising a means for adding selections selected from the group consisting of text strings and icons to at least one of said first list and said second list of selections.

10. The computerized system of claim 8 further comprising a means for selecting selections from both said first list and said second list.

11. The computerized system of claim 8 wherein said selections in said first list are text strings and wherein said selections in said second list are graphical icons.

12. The computerized system of claim 1 further comprising a means for adding selections to said predefined set of selections.

13. The computerized system of claim 1 further comprising a means for automatically selecting said descriptive information received by said descriptive data based on said measurement data received at said measurement data input.

14. The computerized system of claim 13 further comprising a means for displaying said descriptive information selected by said means for automatically selecting.

15. The computerized system of claim 13 wherein said descriptive information in said predefined set of selections includes icons which prompt an operator.

16. The computerized system of claim 13 wherein said descriptive information in said predefined set of selections includes at least one text string which prompts an operator.

17. The computerized system of claim 1 further comprising a means for displaying said measurement information and said descriptive information.

18. The computerized system of claim 1 wherein said descriptive information in said predefined set of selections includes text strings pertaining to location information.

19. The computerized system of claim 18 further comprising a means to automatically select said text strings pertaining to location information based on a selected environmental database model for said predefined set of selections.

20. The computerized system of claim 1 wherein said selections in said predefined set of selections are icons.

21. The computerized system of claim 1 wherein said selection in said predefined set of selections are text strings.

22. The computerized system of claim 1 further comprising a means for displaying said predefined set of selections.

23. The computerized system of claim 1 wherein said means for associating and storing said measurement information and said descriptive information comprises an acceptance switch for allowing an operator to accept descriptive information for said descriptive data input and measurement information for said measurement data input.

24. The computerized system of claim 23 wherein said acceptance switch is a hard or soft button or contact.

25. The computerized system of claim 1 further comprising an environmental database model, and a means for displaying at least a portion of said environmental database model together with at least one of said measurement information and said descriptive information.

26. The computerized system of claim 25 wherein said at least one of said measurement information and said descriptive information is related to at least one specific location in said environmental database model and said means for displaying displays said at least one of said measurement information and said descriptive information at said at least one specific location in said environmental database model.

27. A method for collecting data for a spatially distributed group of objects or networks, comprising the steps of:
obtaining measurement information selected from the group consisting of measured performance metrics and inputted quality measures;
obtaining descriptive information from a predefined set of selections wherein said selections are selected from the group consisting of text strings and icons;
associating said measurement information with said descriptive information within a region of the environment; and
displaying the measurement information, descriptive data input and environment, wherein displaying the measurement information within the region of the environment is in response to a selection from the group of text strings and icons of the descriptive data input.

28. The method of claim 27 further comprising the step of displaying said measurement information and said descriptive information.

29. The method of claim 27 wherein said obtaining descriptive information step includes the steps of displaying said predefined set of selections, and selecting at least one of said selections in said predefined set of selections.

30. The method of claim 27 wherein said obtaining descriptive information step further comprise the step of adding at least one selection to said predefined set of selections.

31. The method of claim 27 wherein said step of obtaining measurement information is performed using a measurement tool.

32. The method of claim 31 wherein said measurement measures a performance metric.

33. The method of claim 31 wherein said step of obtaining measurement information further comprises the step of communicating a measurement from said measurement tool to a computer, and wherein said step of associating and storing is performed in said computer.

34. The method of claim 27 wherein said step of obtaining measurement information is performed by inputting said measurement information with a device selected from the group consisting of a keyboard, stylus, touch screen, mouse, and voice activated detector.

35. The method of claim 27 wherein said step of obtaining measurement information is performed automatically by retrieving a measurement from a measurement tool into a computer memory.

36. The method of claim 27 wherein said step of associating and storing is performed at a time controlled by a user.

37. The method of claim 36 wherein said step of associating and storing includes the step of a user actuating an actuator selected from the group consisting of a button, a switch, a stylus, a knob, a keyboard, a mouse, a touch screen, and a voice activated detector at a selected time.

38. The method of claim 27 wherein step of associating and storing is performed at a location controlled by a user.

39. The method of claim 38 wherein said step of associating and storing includes the step of a user actuating an actuator selected from the group consisting of a button, a switch, a stylus, a knob, a keyboard, a mouse, a touch screen, and a voice activated detector at a selected location.

40. The method of claim 27 wherein said step of obtaining descriptive information is performed automatically in response to said measurement information obtained in said obtaining measurement information step, and wherein said descriptive information is determined by said measurement information.

41. The method of claim 27 wherein said measurement information obtained in said obtaining information step pertains to communications between a slave and a host computer, and said measurement information is derived from communication parameters between said slave and said host computer.

* * * * *

UNITED STATES PATENT AND TRADEMARK OFFICE
CERTIFICATE OF CORRECTION

PATENT NO. : 7,574,323 B2  Page 1 of 1
APPLICATION NO. : 11/329126
DATED : August 11, 2009
INVENTOR(S) : Rappaport et al.

It is certified that error appears in the above-identified patent and that said Letters Patent is hereby corrected as shown below:

ON THE COVER PAGE

On Page 2, item (56), under "OTHER PUBLICATIONS", in Column 2, Line 33, delete "Acurracy" and insert -- Accuracy --, therefor.

On Page 3, item (56), under "OTHER PUBLICATIONS", in Column 1, Line 39, delete "Coomunication" and insert -- Communication --, therefor.

On Page 3, item (56), under "OTHER PUBLICATIONS", in Column 2, Line 31, delete "Agilent" and insert -- "Agilent" --, therefor.

In Column 5, Line 13, delete "Networks." and insert -- Networks: --, therefor.

In Column 10, Line 43, delete "Smokoffet" and insert -- Smokoff et --, therefor.

In Column 27, Line 16, delete "11102." and insert -- 1102. --, therefor.

In Column 27, Line 19, delete "11103," and insert -- 1103, --, therefor.

Signed and Sealed this

Thirty-first Day of August, 2010

David J. Kappos
*Director of the United States Patent and Trademark Office*